United States Patent
Song et al.

(10) Patent No.: US 11,616,328 B2
(45) Date of Patent: Mar. 28, 2023

(54) MATING MODULE AND CABLE CONNECTOR

(71) Applicant: DONGGUAN LUXSHARE TECHNOLOGIES CO., LTD, Guangdong (CN)

(72) Inventors: Tao Song, Dongguan (CN); Jinchuang Lan, Dongguan (CN); Kaide Wang, Dongguan (CN); Xuehui Lu, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 46 days.

(21) Appl. No.: 17/333,882

(22) Filed: May 28, 2021

(65) Prior Publication Data

US 2021/0399502 A1 Dec. 23, 2021

(30) Foreign Application Priority Data

Jun. 19, 2020 (CN) .......................... 202010567796.4
Dec. 9, 2020 (CN) .......................... 202011433181.9
Jan. 12, 2021 (CN) .......................... 202110035372.8

(51) Int. Cl.
*H01R 9/05* (2006.01)
*H01R 13/6591* (2011.01)
(Continued)

(52) U.S. Cl.
CPC ..... *H01R 13/65912* (2020.08); *H01R 13/514* (2013.01); *H01R 13/518* (2013.01);
(Continued)

(58) Field of Classification Search
CPC .......... H01R 13/6591; H01R 13/65912; H01R 13/65914; H01R 13/65915; H01R 13/514;
(Continued)

(56) References Cited

U.S. PATENT DOCUMENTS

| | | | |
|---|---|---|---|
| 4,601,527 | A | 7/1986 | Lemke |
| 5,664,968 | A | 9/1997 | Mickievicz |

(Continued)

FOREIGN PATENT DOCUMENTS

| | | |
|---|---|---|
| CN | 1244959 A | 2/2000 |
| CN | 2513252 Y | 9/2002 |

(Continued)

OTHER PUBLICATIONS

Office Action issued in Chinese Patent Application No. 202010709127.6, dated Mar. 26, 2021.

(Continued)

*Primary Examiner* — Khiem M Nguyen
(74) *Attorney, Agent, or Firm* — Birch, Stewart, Kolasch & Birch, LLP

(57) ABSTRACT

A mating module includes a conductive terminal, a cable, a first metal shield member and a second metal shield member. The cable includes a core electrically connected to the conductive terminal, an insulating layer wrapped on the core, and a shielding layer wrapped on the insulating layer. The first metal shield member includes a first mounting piece. The second metal shield member includes a second mounting piece. The cable further includes a protruding piece connected to the shielding layer. The protruding piece is directly or indirectly clamped by the first mounting piece and the second mounting piece. As a result, the shielding effect of the mating module is improved. The present disclosure also relates to a cable connector having the mating module.

20 Claims, 19 Drawing Sheets

(51) Int. Cl.
  *H01R 13/514* (2006.01)
  *H01R 13/6586* (2011.01)
  *H01R 13/518* (2006.01)
  *H01R 13/6471* (2011.01)
  *H01R 13/6583* (2011.01)
  *H01R 13/6585* (2011.01)
  *H01R 13/631* (2006.01)

(52) U.S. Cl.
  CPC ....... *H01R 13/631* (2013.01); *H01R 13/6471* (2013.01); *H01R 13/6583* (2013.01); *H01R 13/6585* (2013.01); *H01R 13/6586* (2013.01); *H01R 13/6591* (2013.01)

(58) Field of Classification Search
  CPC ................ H01R 13/518; H01R 13/631; H01R 13/6471; H01R 13/6583; H01R 13/6585; H01R 13/6586
  USPC .................................................. 439/578–585
  See application file for complete search history.

(56) References Cited

U.S. PATENT DOCUMENTS

| | | |
|---|---|---|
| 9,350,126 B2 | 5/2016 | Little et al. |
| 2004/0043658 A1 | 3/2004 | Ko |
| 2004/0229510 A1 | 11/2004 | Lloyd et al. |
| 2007/0155239 A1 | 7/2007 | Nakada |
| 2008/0014798 A1 | 1/2008 | Pan |
| 2013/0203273 A1 | 8/2013 | Rathburn |
| 2014/0051295 A1 | 2/2014 | Westman et al. |
| 2014/0248796 A1 | 9/2014 | Pan |
| 2014/0295705 A1 | 10/2014 | Lee et al. |
| 2015/0194771 A1 | 7/2015 | Pan |
| 2015/0303618 A1 | 10/2015 | Lee et al. |
| 2015/0318642 A1 | 11/2015 | Lee et al. |
| 2016/0093985 A1 | 3/2016 | Zhang et al. |
| 2016/0322760 A1 | 11/2016 | Long et al. |
| 2018/0166828 A1 | 6/2018 | Gailus |
| 2019/0044284 A1 | 2/2019 | Dunham |

FOREIGN PATENT DOCUMENTS

| | | |
|---|---|---|
| CN | 2571026 Y | 9/2003 |
| CN | 1491465 A | 4/2004 |
| CN | 1592990 A | 3/2005 |
| CN | 2682605 Y | 3/2005 |
| CN | 101159354 A | 4/2008 |
| CN | 201142392 Y | 10/2008 |
| CN | 101330172 A | 12/2008 |
| CN | 101527409 A | 9/2009 |
| CN | 101542640 A | 9/2009 |
| CN | 101728667 A | 6/2010 |
| CN | 101459299 B | 11/2010 |
| CN | 102088148 A | 6/2011 |
| CN | 102290653 A | 12/2011 |
| CN | 102468562 A | 5/2012 |
| CN | 202395246 U | 8/2012 |
| CN | 102694308 A | 9/2012 |
| CN | 102969621 A | 3/2013 |
| CN | 103151650 A | 6/2013 |
| CN | 103247918 A | 8/2013 |
| CN | 103296546 A | 9/2013 |
| CN | 103311746 A | 9/2013 |
| CN | 203288874 U | 11/2013 |
| CN | 203589266 U | 5/2014 |
| CN | 103928795 A | 7/2014 |
| CN | 103988371 A | 8/2014 |
| CN | 104037551 A | 9/2014 |
| CN | 104241975 A | 12/2014 |
| CN | 104396095 A | 3/2015 |
| CN | 104505678 A | 4/2015 |
| CN | 104577406 A | 4/2015 |
| CN | 204304028 U | 4/2015 |
| CN | 104779487 A | 7/2015 |
| CN | 104810657 A | 7/2015 |
| CN | 105024230 A | 11/2015 |
| CN | 105470679 A | 4/2016 |
| CN | 105470732 A | 4/2016 |
| CN | 105470736 A | 4/2016 |
| CN | 105612664 A | 5/2016 |
| CN | 105703159 A | 6/2016 |
| CN | 105742854 A | 7/2016 |
| CN | 105958245 A | 9/2016 |
| CN | 106207569 A | 12/2016 |
| CN | 205846279 U | 12/2016 |
| CN | 107104329 A | 8/2017 |
| CN | 104009303 B | 1/2018 |
| CN | 107565279 A | 1/2018 |
| CN | 207530119 U | 6/2018 |
| CN | 109390806 A | 2/2019 |
| CN | 109546384 A | 3/2019 |
| CN | 109546388 A | 3/2019 |
| CN | 109586086 A | 4/2019 |
| CN | 109599724 A | 4/2019 |
| CN | 109659726 A | 4/2019 |
| CN | 109841981 A | 6/2019 |
| CN | 109950721 A | 6/2019 |
| CN | 208955335 U | 6/2019 |
| CN | 109994892 A | 7/2019 |
| CN | 209056665 U | 7/2019 |
| CN | 110165448 A | 8/2019 |
| CN | 110247233 A | 9/2019 |
| CN | 110299649 A | 10/2019 |
| CN | 110323622 A | 10/2019 |
| CN | 110544850 A | 12/2019 |
| CN | 110600943 A | 12/2019 |
| CN | 110649407 A | 1/2020 |
| CN | 110718815 A | 1/2020 |
| CN | 110808499 A | 2/2020 |
| CN | 110838635 A | 2/2020 |
| CN | 111092342 A | 5/2020 |
| CN | 111370890 A | 7/2020 |
| CN | 111682366 A | 9/2020 |
| JP | 2000-058172 A | 2/2000 |
| TW | 415133 B | 12/2000 |
| TW | 459428 B | 10/2001 |
| TW | M461166 U1 | 9/2013 |
| TW | I414111 B | 11/2013 |
| TW | I452767 B | 9/2014 |
| TW | I545845 B | 8/2016 |
| TW | 201733225 A | 9/2017 |
| TW | I600231 B | 9/2017 |
| TW | 201810825 A | 3/2018 |
| TW | I528659 B | 4/2018 |
| TW | I623154 B | 5/2018 |
| TW | 201834333 A | 9/2018 |
| TW | 201841440 A | 11/2018 |
| TW | I648925 B | 1/2019 |
| TW | M585436 U | 10/2019 |
| TW | 201943158 A | 11/2019 |
| TW | M591270 U | 2/2020 |
| TW | M593091 U | 4/2020 |
| WO | WO 2016/168820 A1 | 10/2016 |
| WO | WO 2017/106266 A1 | 6/2017 |

OTHER PUBLICATIONS

Office Action issued in Chinese Patent Application No. 202010709180.6, dated Mar. 30, 2021.
Office Action issued in Chinese Patent Application No. 202010710402.6, dated Mar. 3, 2021.
Office Action issued in Chinese Patent Application No. 202010710463.2, dated Mar. 25, 2021.
Office Action issued in Chinese Patent Application No. 202010931721.X, dated Mar. 25, 2021.
Office Action issued in Taiwanese Patent Application No. 109128295, dated Apr. 14, 2021.
Office Action issued in Taiwanese Patent Application No. 109129938, dated Apr. 15, 2021.

MATING MODULE AND CABLE CONNECTOR

CROSS-REFERENCE TO RELATED APPLICATIONS

This patent application claims priority of a Chinese Patent Application No. 202010567796.4, filed on Jun. 19, 2020 and titled "BACKPLANE CONNECTOR ASSEMBLY", a Chinese Patent Application No. 202011433181.9, filed on Dec. 9, 2020 and titled "ELECTRICAL CONNECTOR ASSEMBLY", and a Chinese Patent Application No. 202110035372.8, filed on Jan. 12, 2021 and titled "MATING MODULE AND CABLE CONNECTOR", the entire content of which is incorporated herein by reference.

TECHNICAL FIELD

The present disclosure relates to a mating module and a cable connector, which belongs to a technical field of connectors.

BACKGROUND

Existing electrical connector assemblies usually include a male connector and a female connector. The male connector usually includes a male housing and a plurality of male mating modules mounted to the male housing. Each male mating module includes an insulating frame, a plurality of male conductive terminals insert-molded with the insulating frame, and a first metal shield disposed on at least one side of the insulating frame. Some male connectors also include cables connected to the male conductive terminals.

The female connector usually includes a female housing and a plurality of female mating modules mounted to the female housing. Each female terminal mating module includes an insulating frame, a plurality of female conductive terminals insert-molded with the insulating frame, and a second metal shield disposed on at least one side of the insulating frame. Some female connectors also include cables connected to the female conductive terminals.

As the market has higher and higher requirements for transmission of connectors, the flexibility and shielding requirements of the cables are also getting higher and higher, and there is still room for improvement in the connection between the cables and shielding element in the prior art.

SUMMARY

An object of the present disclosure is to provide a mating module with better shielding effect and a cable connector having the mating module.

In order to achieve the above object, the present disclosure adopts the following technical solution: a mating module, comprising: a conductive terminal; a cable comprising a core electrically connected to the conductive terminal, an insulating layer wrapped on the core and a shielding layer wrapped on the insulating layer; a first metal shield member comprising a first mounting piece; and a second metal shield member comprising a second mounting piece; wherein the cable further comprises a protruding piece connected with the shielding layer, the protruding piece is directly or indirectly clamped by the first mounting piece and the second mounting piece, and the protruding piece is fixed to the first mounting piece and/or the second mounting piece by soldering.

In order to achieve the above object, the present disclosure adopts the following technical solution: a cable connector, comprising: a housing; and a plurality of mating modules mounted to the housing; each mating module comprising: a conductive terminal; a cable comprising a core electrically connected to the conductive terminal, an insulating layer wrapped on the core and a shielding layer wrapped on the insulating layer; a first metal shield member comprising a first mounting piece; and a second metal shield member comprising a second mounting piece; wherein the cable further comprises a protruding piece connected with the shielding layer, the protruding piece is directly or indirectly clamped by the first mounting piece and the second mounting piece, and the protruding piece is fixed to the first mounting piece and/or the second mounting piece by soldering.

Compared with the prior art, the present disclosure provides a protruding piece connected to the shielding layer, and the protruding piece is fixed to the first mounting piece and/or the second mounting piece by soldering, thereby improving the shielding effect of the mating module and the cable connector having the mating module.

DETAILED DESCRIPTION

Figure 1:
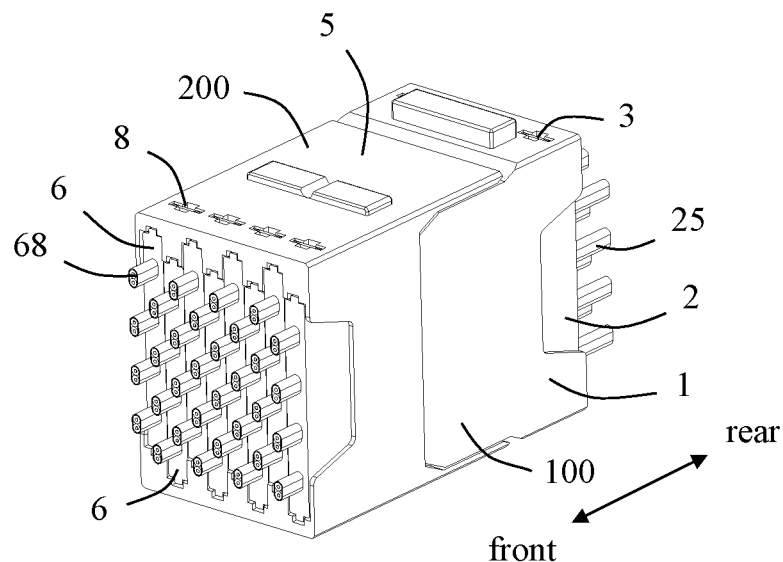
FIG. 1 is a perspective schematic view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
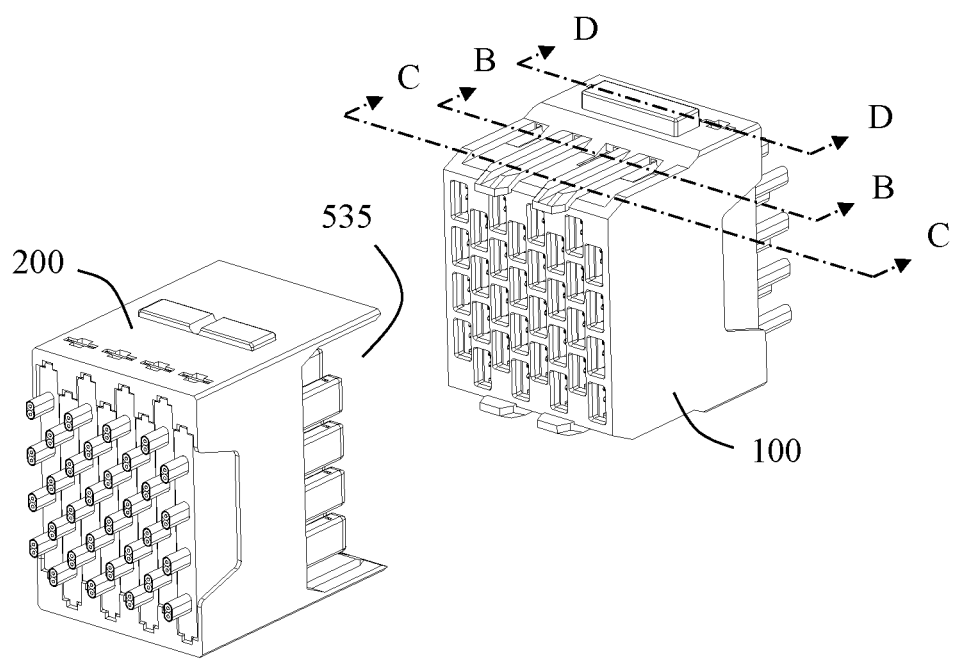
FIG. 2 is a partial perspective exploded view of FIG. 1, in which a first electrical connector and a second electrical connector are separated from each other.

Referring to FIGS. 1 and 2, an illustrated embodiment of the present disclosure discloses an electrical connector assembly including a first electrical connector 100 and a second electrical connector 200 for mating with the first electrical connector 100. The first electrical connector 100 is a first backplane connector, and the second electrical connector 200 is a second backplane connector. Specifically, in the illustrated embodiment of the present disclosure, the first backplane connector is a first backplane cable connector, and the second backplane connector is a second backplane cable connector. The first electrical connector 100 and the second electrical connector 200 are mated with each other along a mating direction for signal transmission. In the illustrated embodiment of the present disclosure, the mating direction is a front-rear direction.

Figure 3:
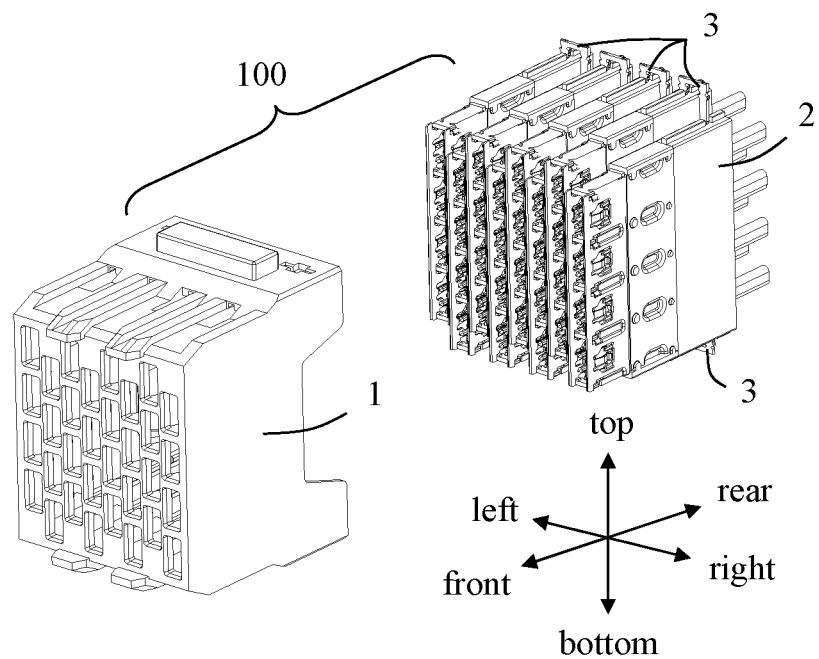
FIG. 3 is a partial perspective exploded view of the first electrical connector in FIG. 2, in which a first housing is separated.
Figure 4:
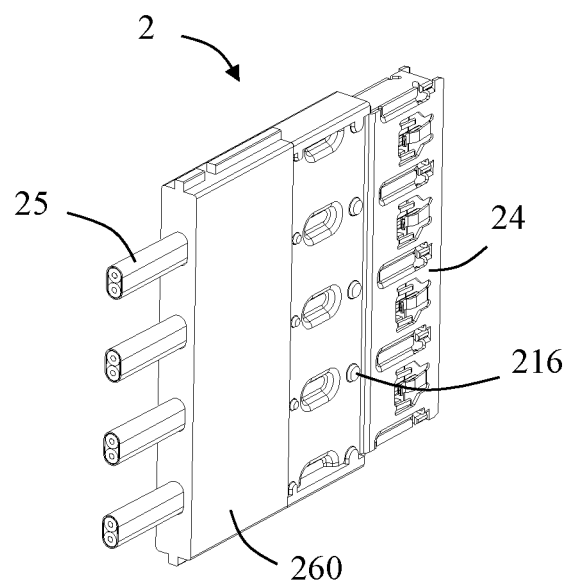
FIG. 4 is a perspective schematic view of a first mating module of the first electrical connector.

Referring to FIGS. 3 and 4, the first electrical connector 100 includes a first housing 1, a plurality of first mating modules 2 mounted to the first housing 1, and a plurality of first positioning pieces 3 for positioning the first mating modules 2 in the first housing 1.

Figure 5:
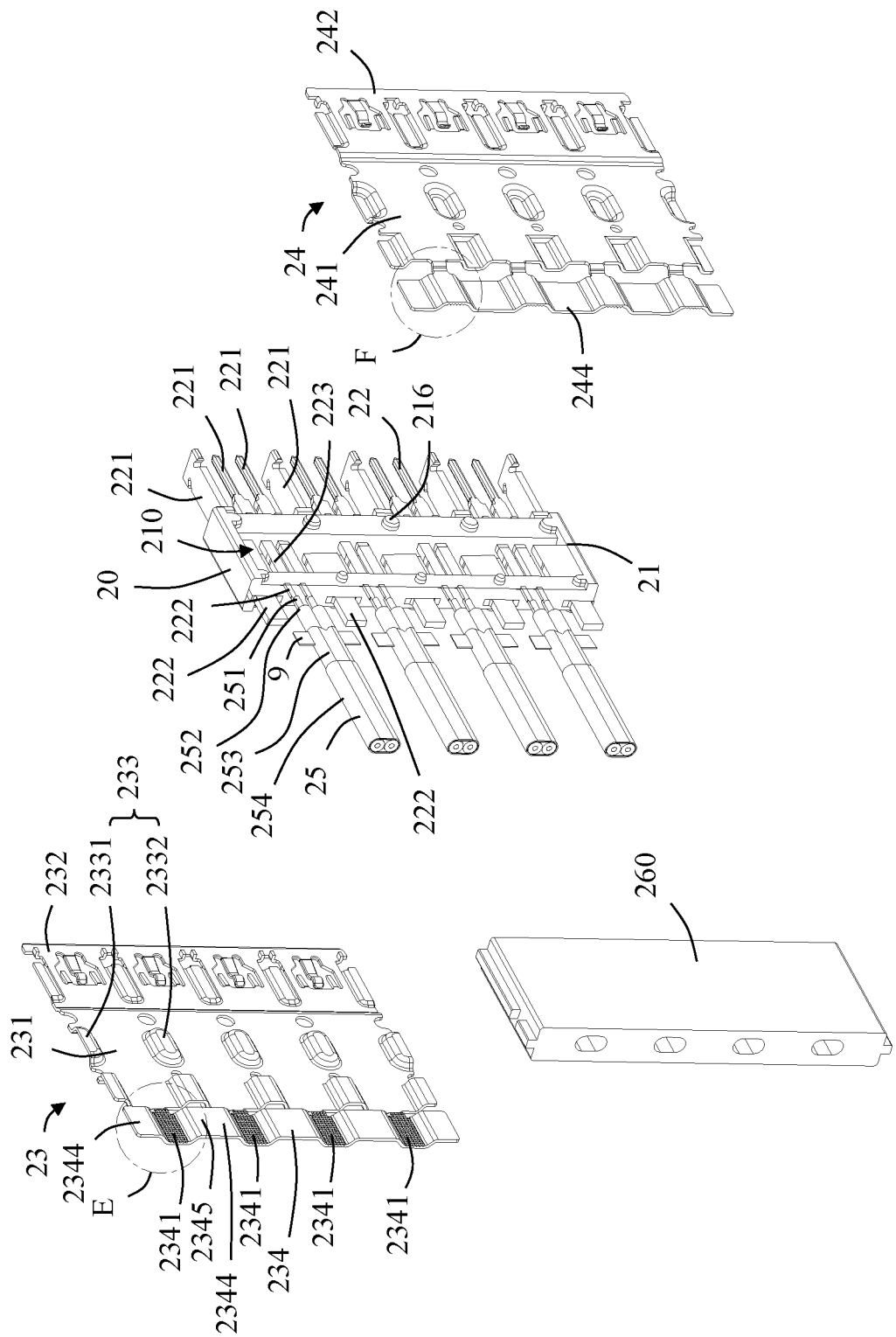
FIG. 5 is a partially exploded perspective view of FIG. 4.
Figure 6:
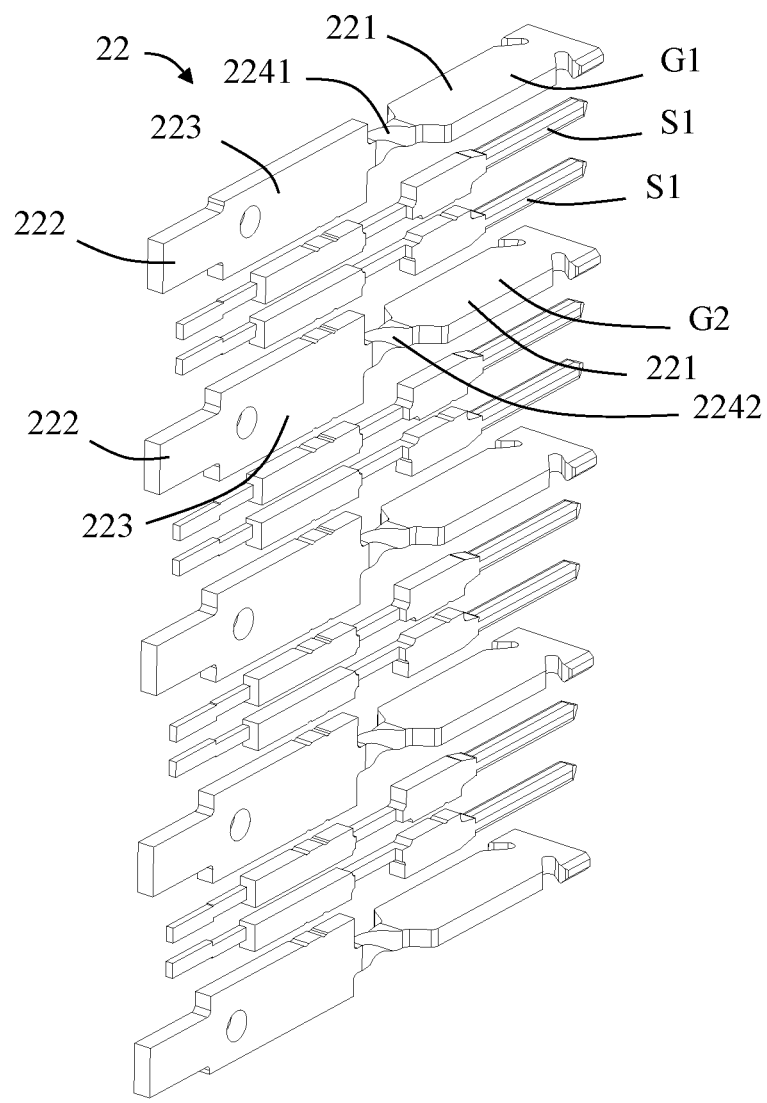
FIG. 6 is a perspective schematic view of first conductive terminals in FIG. 5.

Referring to FIGS. 4 to 6, each of the first mating modules 2 includes a first terminal module 20, a first metal shield 23 located on one side of the first terminal module 20, a second metal shield 24 located on the other side of the first terminal module 20, a plurality of first cables 25 connected to the first terminal module 20, and a first outer covering portion 260 partially covering the first terminal module 20, the first metal shield 23, the second metal shield 24 and the first cables 25.

Referring to FIGS. 4 and 5, each first terminal module 20 includes an insulating bracket 21 and a plurality of first conductive terminals 22 fixed to the insulating bracket 21. The insulating bracket 21 is roughly frame-shaped and includes a hollow portion 210 and a plurality of posts 216. The posts 216 are adapted to fix and position the first metal shield 23 and the second metal shield 24.

Figure 8:
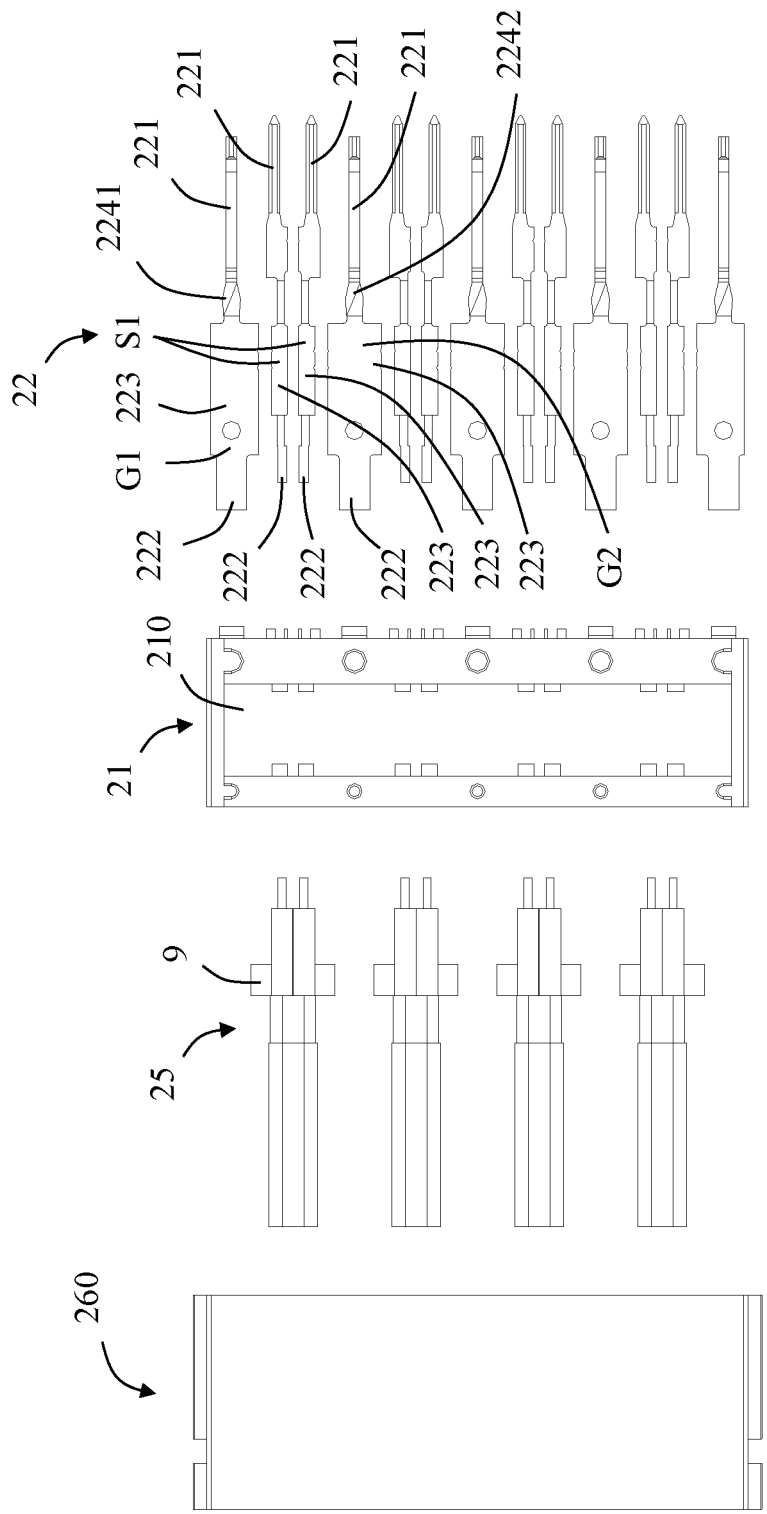
FIG. 8 is a side view of the first conductive terminals, an insulating bracket, the first cables and a first outer covering portion which are separated from each other.

Referring to FIGS. 6 and 8, each group of first conductive terminals 22 include a first mating portion 221, a first tail portion 222, and a first connection portion 223 located between the first mating portion 221 and the first tail portion 222. The first connection portions 223 of the first conductive terminals 22 are fixed to the insulating bracket 21. The first connection portions 223 are partially exposed in the hollow portion 210 in order to adjust impedance.

The first mating portion 221 extends forwardly and protrudes beyond the insulating bracket 21 for mating with the second electrical connector 200. The first tail portion 222 extends backwardly and protrudes beyond the insulating bracket 21 for being electrically connected to the first cable 25. In the illustrated embodiment of the present disclosure, each first conductive terminal 22 is of a straight configuration and extends along the front-rear direction.

Each group of first conductive terminals 22 include a plurality of first ground terminals G1, a plurality of second ground terminals G2, and a plurality of first signal terminals S1. In the illustrated embodiment of the present disclosure, two adjacent first signal terminals S1 form a pair of first differential signal terminals. Each pair of first differential signal terminals are located between one first ground terminal G1 and one second ground terminal G2. That is, each group of first conductive terminals 22 are arranged in a manner of G1-S1-S1-G2, which is beneficial to improve the quality of signal transmission. The first differential signal terminals are narrow-side coupling or wide-side coupling. A width of the first ground terminal G1 (for example, a spaced distance in a left-right direction) and a width the second ground terminal G2 (for example, the spaced distance in the left-right direction) are greater than a width of each first signal terminal S1 which is located between the first ground terminal G1 and the second ground terminal G2. Therefore, it is beneficial to increase the shielding area and improve the shielding effect.

In the illustrated embodiment of the present disclosure, the first connection portions 223 of the first conductive terminals 22 are partially insert-molded with the insulating bracket 21. Of course, in other embodiments, the first conductive terminals 22 may also be mounted to the insulating bracket 21 by means of assembling or the like. In the illustrated embodiment of the present disclosure, the first contact portion 221 of the first signal terminal S1 is substantially needle-shaped. The first contact portion 221 of the first ground terminal G1 and the first contact portion 221 of the second ground terminal G2 are substantially flat-shaped. The first contact portion 221 of the first signal terminal S1 and the first connection portion 223 of the first conductive terminal 22 are both coplanar, which means they are located in a same first plane (for example, a vertical plane). It should be noted that the technical term "coplanar" used in the present disclosure is intended to indicate that related components are substantially flush, which includes situations of incomplete coplanarity caused by manufacturing tolerances. In the illustrated embodiment of the present disclosure, the first ground terminal G1 includes a first torsion portion 2241 connecting its first contact portion 221 and its first connection portion 223, so that the first contact portion 221 of the first ground terminal G1 is located in a second plane (for example, a horizontal plane) perpendicular to the first plane. The second ground terminal G2 includes a second torsion portion 2242 connecting its first contact portion 221 and its first connection portion 223, so that the first contact portion 221 of the second ground terminal G2 is also located in the second plane (for example, the horizontal plane) perpendicular to the first plane. The first contact portion 221 of the first ground terminal G1 and the first contact portion 221 of the second ground terminal G2 are parallel to each other.

Figure 9:
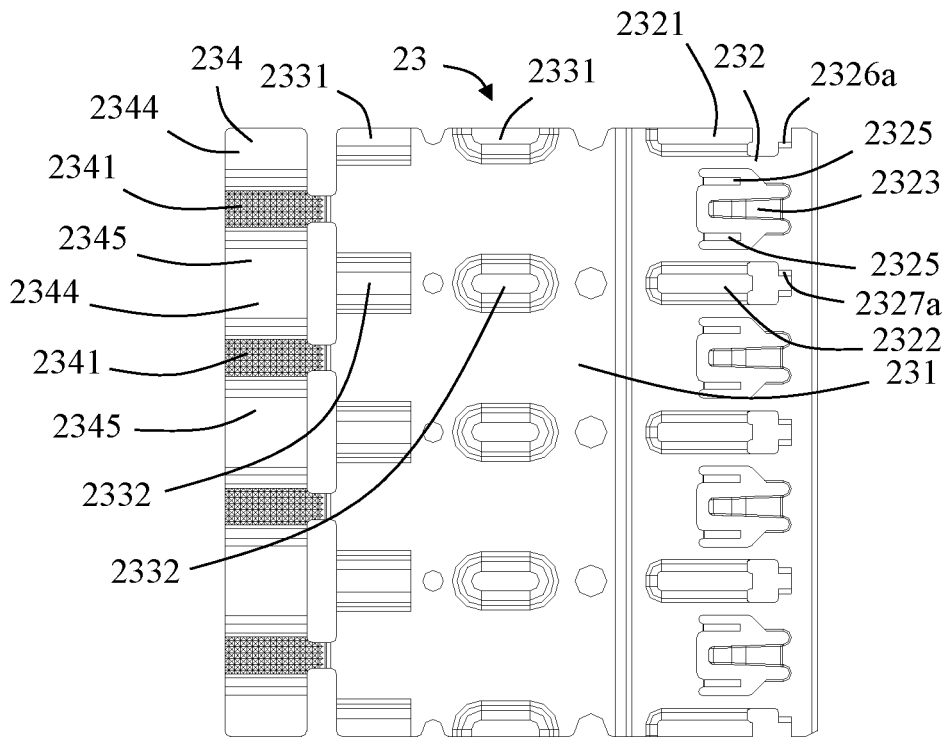
FIG. 9 is a right side view of a first metal shield of the first electrical connector in FIG. 5.

In the illustrated embodiment of the present disclosure, the first metal shield 23 and the second metal shield 24 are symmetrically disposed on opposite sides of the insulating bracket 21. Referring to FIGS. 5 and 9, the first metal shield 23 includes a first main body portion 231 and a first extension portion 232 extending forwardly from a front edge of the first main body portion 231, and a first extension tail 234 extending rearwardly from a rear edge of the first main body portion 231. In an embodiment of the present disclosure, the first extension tail 234 is made of copper material electroplated with nickel. The first main body portion 231 is located on one side of the first connection portions 223 of the first conductive terminals 22. The first extension portion 232 is located on one side of the first contact portions 221 of the first conductive terminals 22. The first extension tail 234 is located on one side of the first tail portions 222 of the first conductive terminals 22. In the illustrated embodiment of the present disclosure, the first extension portion 232 and the first main body portion 231 are located in different planes, in which the first extension portion 232 is farther away from the second metal shield 24 than the first main body portion 231. The first extension tail 234 is closer to the second metal shield 24 than the first main body portion 231. The first main body 231 includes a plurality of ribs 233. The ribs 233 include a plurality of first ribs 2331 protruding toward the first ground terminals G1 and a plurality of second ribs 2332 protruding toward the second ground terminals G2. The first ribs 2331 corresponding to the first ground terminal G1 are disposed along an extending direction of the first connection portion 223 of the first ground terminal G1. The second ribs 2332 corresponding to the second ground terminal G2 are disposed along an extending direction of the first connection portion 223 of the second ground terminal G2.

The first extension portion 232 includes a plurality of first bulges 2321 protruding toward the corresponding first contact portions 221 of the first ground terminals G1, a plurality of second bulges 2322 protruding toward the corresponding first contact portions 221 of the second ground terminals G2, and a plurality of first elastic pieces 2323 each of which is located between adjacent first bulge 2321 and adjacent second bulge 2322. In the illustrated embodiment of the present disclosure, the first extension portion 232 further includes two first protruding tabs 2325 located at opposite sides of each first elastic piece 2323. The first protruding tabs 2325 and the first elastic pieces 2323 extend along opposite directions. The first protruding tabs 2325 protrude sidewardly to contact the adjacent first terminal module 2 so as to improve the shielding effect. In addition, the first extension portion 232 further includes a first abutting block 2326a and a second abutting block 2327a. Corresponding to one first ground terminal G1 and one second ground terminal G2, the number of the first abutting block 2326a and the second abutting block 2327a may be one or two. The first abutting block 2326a and the second abutting block 2327a are used to abut against or clamp the corresponding mating portions 221 of the first ground terminal G1 and the second ground terminal G2 along the vertical direction so as to achieve position limit.

Figure 11:
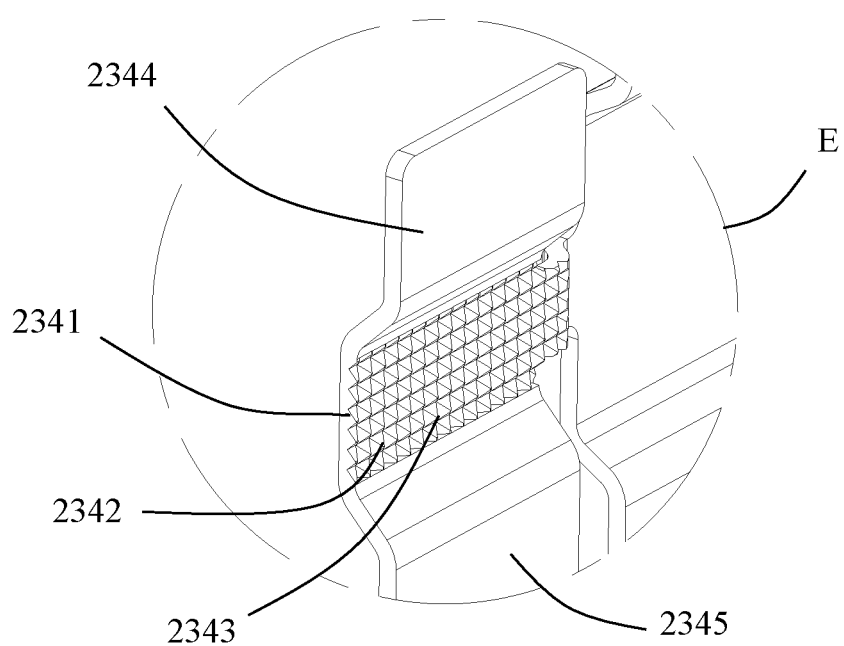
FIG. 11 is a partial enlarged view of a circled portion E in FIG. 5.

Referring to FIG. 11, in the illustrated embodiment of the present disclosure, the first extension tail 234 includes a plurality of first abutting portions 2341 and a plurality of first protrusions 2342 extending in a direction toward the second metal shield 24. The first protrusions 2342 are saw teeth each of which includes a substantially pyramid-shaped tip portion 2343.

Referring to FIG. 9, in an embodiment of the present disclosure, the first extension tail 234 further includes a plurality of first bridge portions 2344 and a plurality of second bridge portions 2345 extending from upper and lower sides of the first abutting portions 2341, respectively. The adjacent first bridge portion 2344 and second bridge portion 2345 are connected together. By providing the first bridge portions 2344 and the second bridge portions 2345, on the one hand, the grounding area of the first extension tail 234 is increased, thus the shielding effect is improved; on the other hand, the first extension tail 234 can be connected as a whole along the vertical direction, thereby improving the structural strength. In the illustrated embodiment of the present disclosure, the first bridge portions 2344 and the second bridge portions 2345 are located in a same vertical plane. The plurality of first abutting portions 2341 are located in a different vertical plane.

Figure 10:
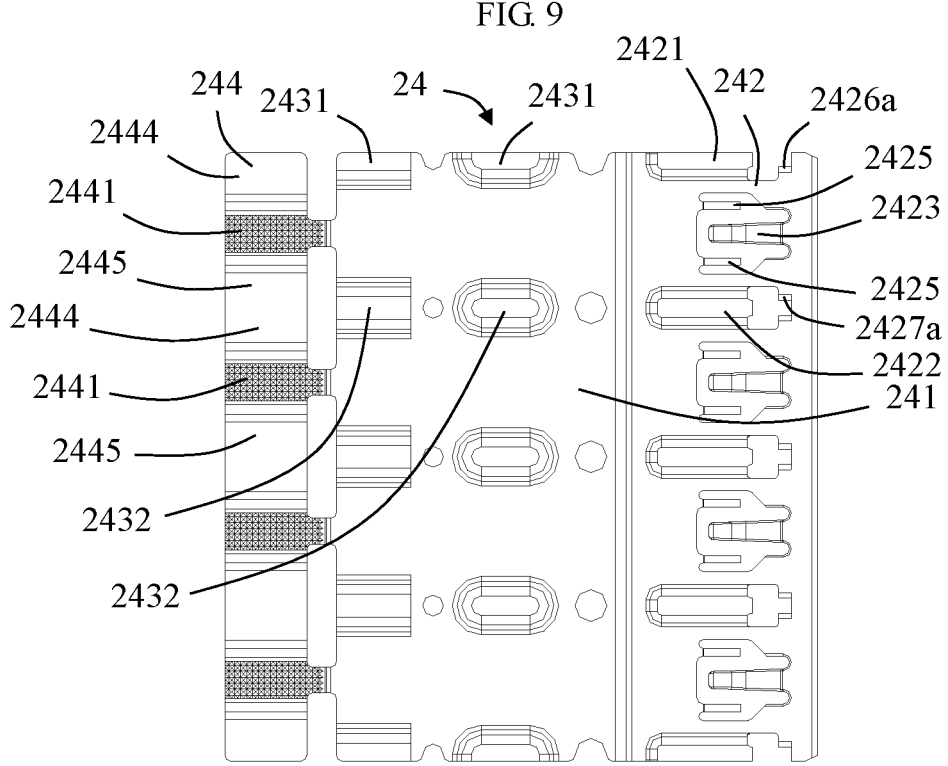
FIG. 10 is a side view of a second metal shield of the first electrical connector in FIG. 5 from another angle.

Similarly, referring to FIGS. 5 and 10, the second metal shield 24 includes a second main body portion 241 and a second extension portion 242 extending forwardly from a front edge of the second main body portion 241, and a second extension tail 244 extending rearwardly from a rear edge of the second main body portion 241. In an embodiment of the present disclosure, the second extension tail 244 is made of copper material electroplated with nickel. The second main body portion 241 is located on the other side of the first connection portions 223 of the first conductive terminals 22. The second extension portion 242 is located on the other side of the first contact portions 221 of the first conductive terminals 22. The second extension tail 244 is located on the other side of the first tail portions 222 of the first conductive terminals 22. In the illustrated embodiment of the present disclosure, the second extension portion 242 and the second main body portion 241 are located in different planes, in which the second extension portion 242 is farther away from the first metal shield 23 than the second main body portion 241. The second extension tail 244 is closer to the first metal shield 23 than the second main body portion 241. The second main body 241 includes a plurality of ribs 243. The ribs 243 include a plurality of third ribs 2431 protruding toward the first ground terminals G1 and a plurality of fourth ribs 2432 protruding toward the second ground terminals G2. The third ribs 2431 are disposed along the extending direction of the first connection portion 223 of the first ground terminal G1. The fourth ribs 2432 are disposed along the extending direction of the first connection portion 223 of the second ground terminal G2. In the illustrated embodiment of the present disclosure, the third ribs 2431 and the fourth ribs 2432 are formed by stamping the second main body portion 241. The third ribs 2431 and the fourth ribs 2432 protrude toward the first metal shield 23.

The second extension portion 242 includes a plurality of third bulges 2421 protruding toward the first contact portions 221 of the first ground terminals G1, a plurality of fourth bulges 2422 protruding toward the first contact portions 221 of the second ground terminals G2, and a plurality of second elastic pieces 2423 each of which is located between adjacent third bulge 2421 and adjacent fourth bulge 2422. The second elastic pieces 2423 extend along directions toward the second main body portion 241. In the illustrated embodiment of the present disclosure, the second extension portion 242 further includes two second protruding tabs 2425 located at opposite sides of each second elastic piece 2423. The second protruding tabs 2425 and the second elastic pieces 2423 extend along opposite directions. The second protruding tabs 2425 protrude sidewardly to contact the adjacent first terminal module 2 so as to improve the shielding effect.

In addition, the second extension portion 242 further includes a third abutting block 2426a and a fourth abutting block 2427a. Corresponding to one first ground terminal G1 and one second ground terminal G2, the number of the third abutting block 2426a and the fourth abutting block 2427a may be one or two. The third abutting block 2426a and the fourth abutting block 2427a are used to abut against or clamp the corresponding mating portions 221 of the first ground terminal G1 and the second ground terminal G2 along the vertical direction so as to achieve position limit.

Figure 12:
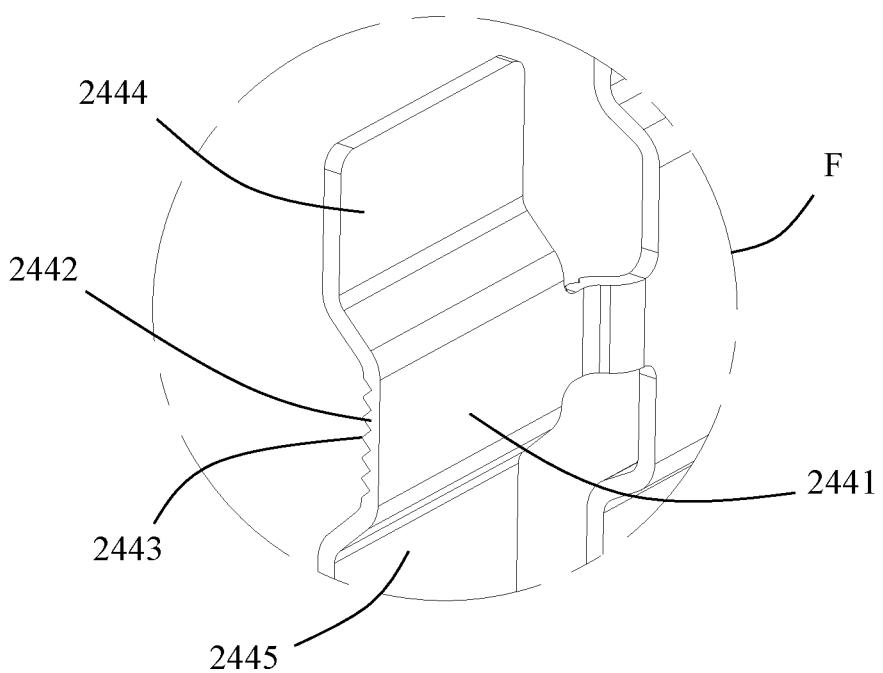
FIG. 12 is a partial enlarged view of a circled portion F in FIG. 5.

Referring to FIG. 12, in the illustrated embodiment of the present disclosure, the second extension tail 244 includes a plurality of second abutting portions 2441 and a plurality of second protrusions 2442 extending in a direction toward the first metal shield 23. The second protrusions 2442 are saw teeth each of which includes a substantially pyramid-shaped tip portion 2443.

Referring to FIG. 10, in an embodiment of the present disclosure, the second extension tail 244 further includes a plurality of third bridge portions 2444 and a plurality of fourth bridge portions 2445 extending from upper and lower sides of the second abutting portions 2441, respectively. The adjacent third bridge portion 2444 and fourth bridge portion 2445 are connected together. By providing the third bridge portions 2444 and the fourth bridge portions 2445, on the one hand, the grounding area of the second extension tail 244 is increased, thus the shielding effect is improved; on the other hand, the second extension tail 244 can be connected as a whole along the vertical direction, thereby improving the structural strength. In the illustrated embodiment of the present disclosure, the third bridge portions 2444 and the fourth bridge portions 2445 are located in a same vertical plane. The plurality of second abutting portions 2441 are located in another different vertical plane.

Figure 7:
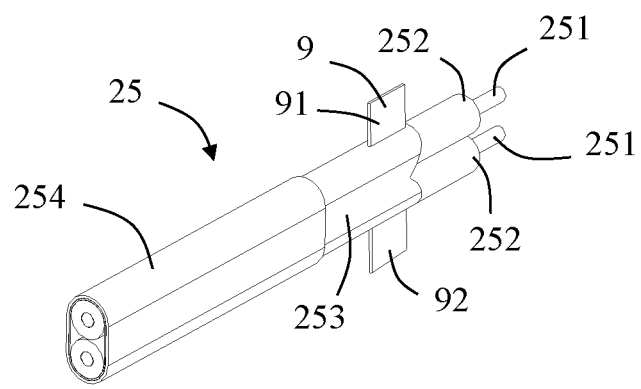
FIG. 7 is a perspective schematic view of a first cable.

Referring to FIG. 7, each of the first cables 25 includes first cores 251 for electrically connecting with the first tail portions 222 of the first differential signal terminals, first insulating layers 252 wrapped on the first cores 251, a first shielding layer 253 wrapped on the first insulating layers 252, and a first insulating outer layer 254 wrapped on a part of the first shielding layer 253. In an embodiment of the present disclosure, the first cores 251 are fixed to the first tail portions 222 of the first differential signal terminals by soldering. In the illustrated embodiment of the present disclosure, for each first cable 25 per se, the first shielding layer 253 is partially exposed to the first insulating outer layer 254 in order to be in contact with the first metal shield 23 and the second metal shield 24.

Referring to FIGS. 13 to 16, in the illustrated embodiment of the present disclosure, the first contact portion 221 and the first connection portion 223 of the first ground terminal G1 have a first wide surface $221a$ and a first narrow surface $221b$ perpendicular to the first wide surface $221a$. The first contact portion 221 and the first connection portion 223 of the second ground terminal G2 have a second wide surface $221c$ and a second narrow surface $221d$ perpendicular to the second wide surface $221c$. The first connection portions 223 of each pair of first differential signal terminals are located between the first narrow surface $221b$ of the first ground terminal G1 and the second narrow surface $221d$ of the second ground terminal G2 which are located on opposite sides of the first connection portions 223 of each pair of first differential signal terminals (referring to FIG. 14). The first contact portions 221 of each pair of first differential signal terminals are located between the first wide surface $221a$ of the first ground terminal G1 and the second wide surface $221c$ of the second ground terminal G2 which are located on opposite sides of the first contact portions 221 of each pair of first differential signal terminals (referring to FIG. 16). In the illustrated embodiment of the present disclosure, a width of the first wide surface $221a$ and a width of the second wide surface $221c$ are greater than a width of each first contact portion 221 of the first signal terminals S1, thereby better shielding can be provided for the first contact portions 221 of the first signal terminals S1.

Figure 13:
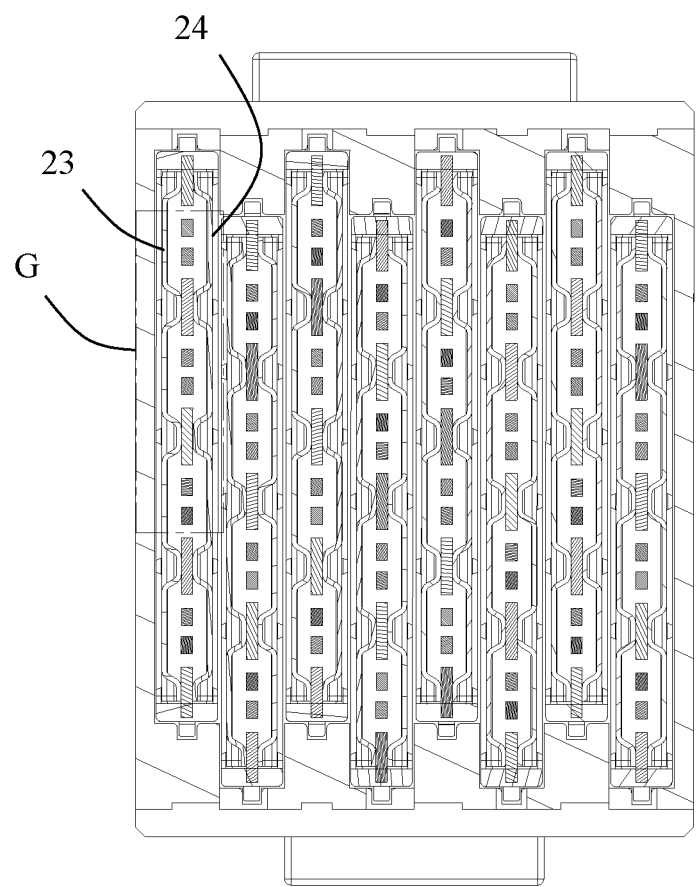
FIG. 13 is a schematic cross-sectional view taken along line B-B in FIG. 2.
Figure 14:
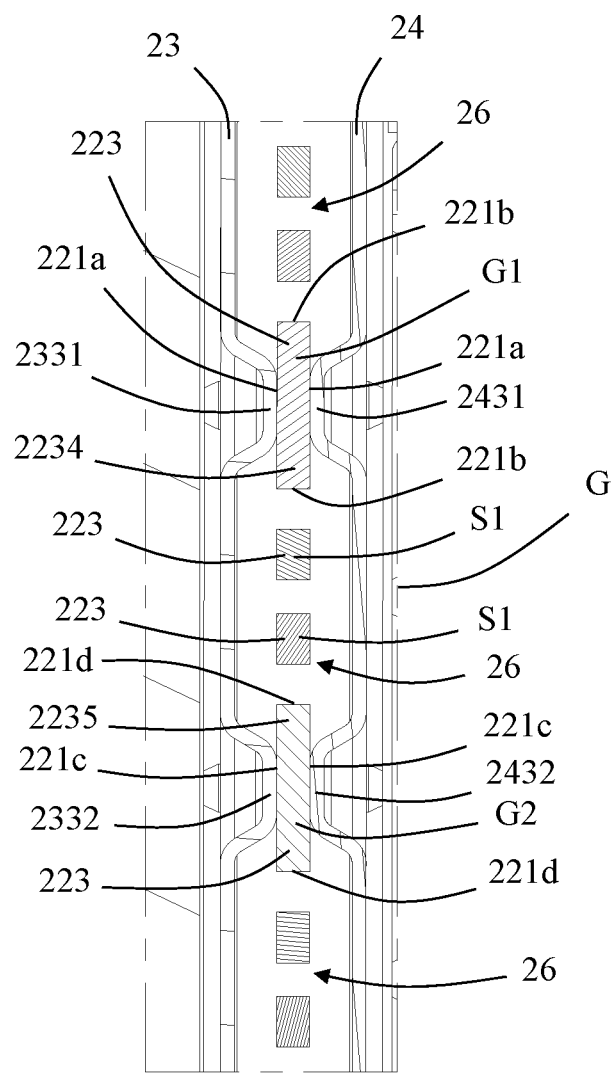
FIG. 14 is a partial enlarged view of a frame portion G in FIG. 13.

Referring to FIGS. 13 and 14, along a length of the first connection portion 223 of the first conductive terminal 22, the first rib 2331 of the first metal shield 23 and the third rib 2431 of the second metal shield 24 respectively contact two opposite sides of the first connection portion 223 of the first ground terminal G1, and the second rib 2332 of the first metal shield 23 and the fourth rib 2432 of the second metal shield 24 respectively contact two opposite sides of the first connection portion 223 of the second ground terminal G2, thereby forming a shielding cavity 26 surrounding the outer periphery of the first connection portions 223 of each pair of first differential signal terminals. In the illustrated embodiment of the present disclosure, the first rib 2331 and the third rib 2431 respectively contact the first wide surface $221a$ of the first connection portion 223 of the first ground terminal G1. The second rib 2332 and the fourth rib 2432 respectively contact the second wide surface $221c$ of the first connection portion 223 of the second ground terminal G2. In the illustrated embodiment of the present disclosure, the shielding cavity 26 is jointly formed by the first main body portion 231, the second main body portion 241, the first ground terminal G1 and the second ground terminal G2. The first connection portion 223 of the first ground terminal G1 includes a first tab portion 2234 protruding into the shielding cavity 26. The first connection portion 223 of the second ground terminal G2 includes a second tab portion 2235 protruding into the shielding cavity 26. The first connection portions 223 of the first differential signal terminals are located between the first tab portion 2234 and the second tab portion 2235. In the illustrated embodiment of the present disclosure, there are a plurality of the shielding cavities 26 which are disposed along an arrangement direction of each group of the first conductive terminals 22. Two adjacent shielding cavities 26 share a single first ground terminal G1 or a single second ground terminal G2. In addition, a part of the shared first ground terminal G1 protrudes into one shielding cavity 26, and another part of the shared first ground terminal G1 protrudes into another shielding cavity 26.

Figure 15:
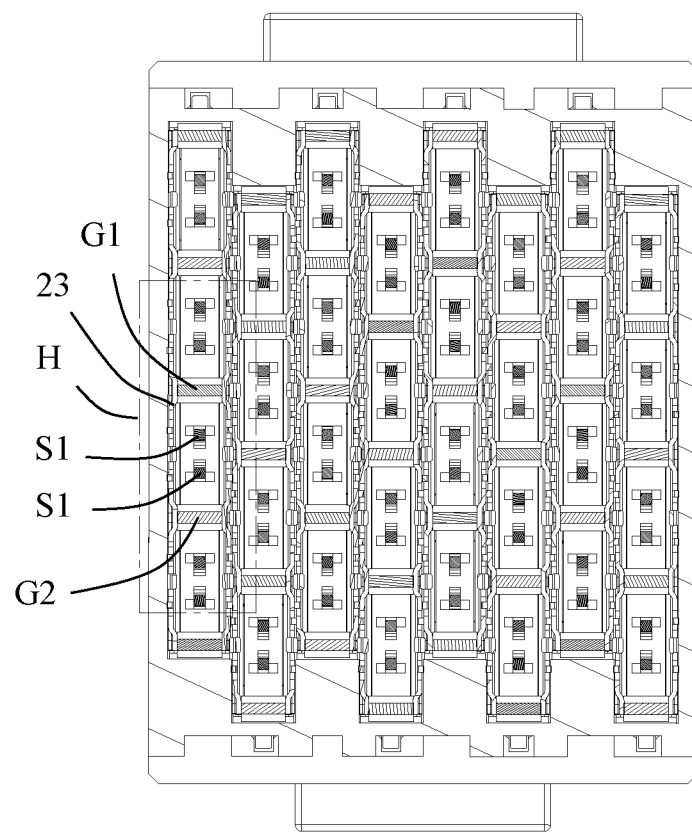
FIG. 15 is a schematic cross-sectional view taken along line C-C in FIG. 2.
Figure 16:
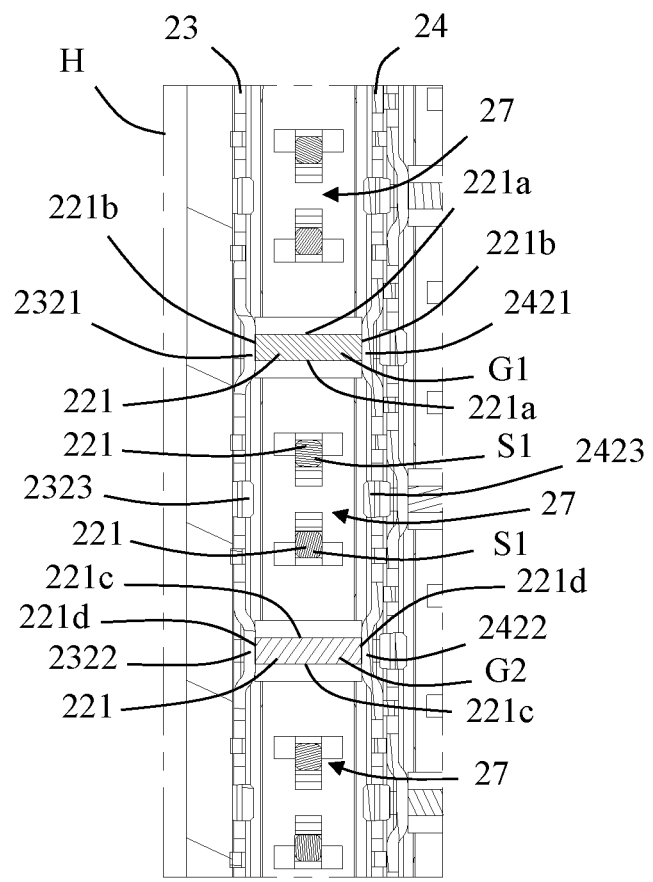
FIG. 16 is a partial enlarged view of a frame portion H in FIG. 15.

Referring to FIGS. 15 and 16, in the length of the first contact portion 221 of the first conductive terminal 22, the first bulge 2321 of the first metal shield 23 and the third bulge 2421 of the second metal shield 24 respectively contact two opposite side surfaces of the first contact portion 221 of the first ground terminal G1, and the second bulge 2322 of the first metal shield 23 and the fourth bulge 2422 of the second metal shield 24 respectively contact two opposite side surfaces of the first contact portion 221 of the second ground terminal G2. In the illustrated embodiment of the present disclosure, the first bulge 2321 of the first metal shield 23 and the third bulge 2421 of the second metal shield 24 respectively contact the first narrow surfaces 221b of the first contact portion 221 of the first ground terminal G1. The second bulge 2322 of the first metal shield 23 and the fourth bulge 2422 of the second metal shield 24 respectively contact the second narrow surfaces 221d of the first contact portion 221 of the second ground terminal G2. The first extension portion 232, the second extension portion 242, the first ground terminal G1 and the second ground terminal G2 jointly form a shielding space 27 for accommodating the corresponding first contact portions 221 of the first differential signal terminals. The first elastic piece 2323 and the second elastic piece 2423 extend into the shielding space 27. In the illustrated embodiment of the present disclosure, there are multiple shielding spaces 27 which are disposed along a stacking direction of each group of the first conductive terminals 22. Two adjacent shielding spaces 27 share a single first ground terminal G1 or a single second ground terminal G2. One first wide surface 221a of the first contact portion 221 of the shared first ground terminal G1 is exposed to the shielding space 27, and the other first wide surface 221a of the first contact portion 221 of the shared first ground terminal G1 is exposed to an adjacent shielding space 27. Similarly, a first wide surface 221c of the first contact portion 221 of the shared second ground terminal G2 is exposed to the adjacent shielding space 27, and the other wide surface 221c of the first contact portion 221 of the shared second ground terminal G2 is exposed to another adjacent shielding space 27.

Figure 17:
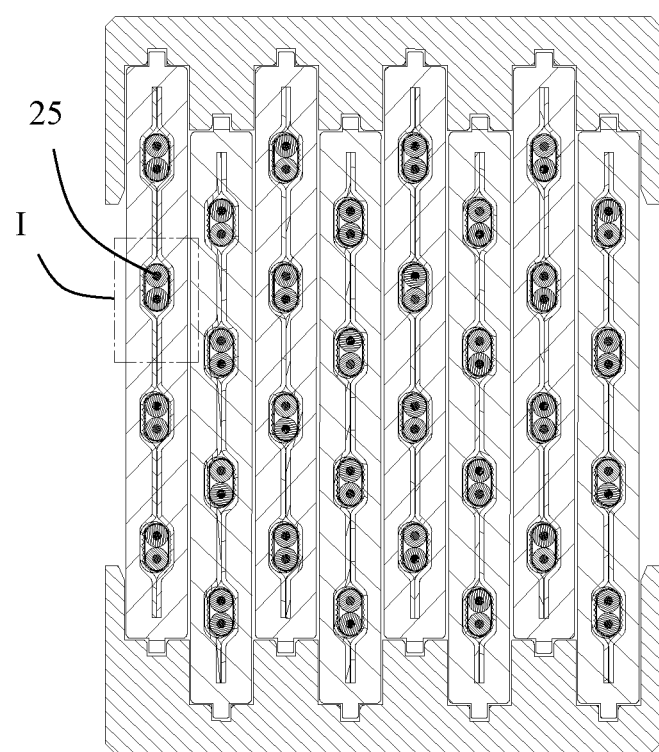
FIG. 17 is a schematic cross-sectional view taken along line D-D in FIG. 2.
Figure 18:
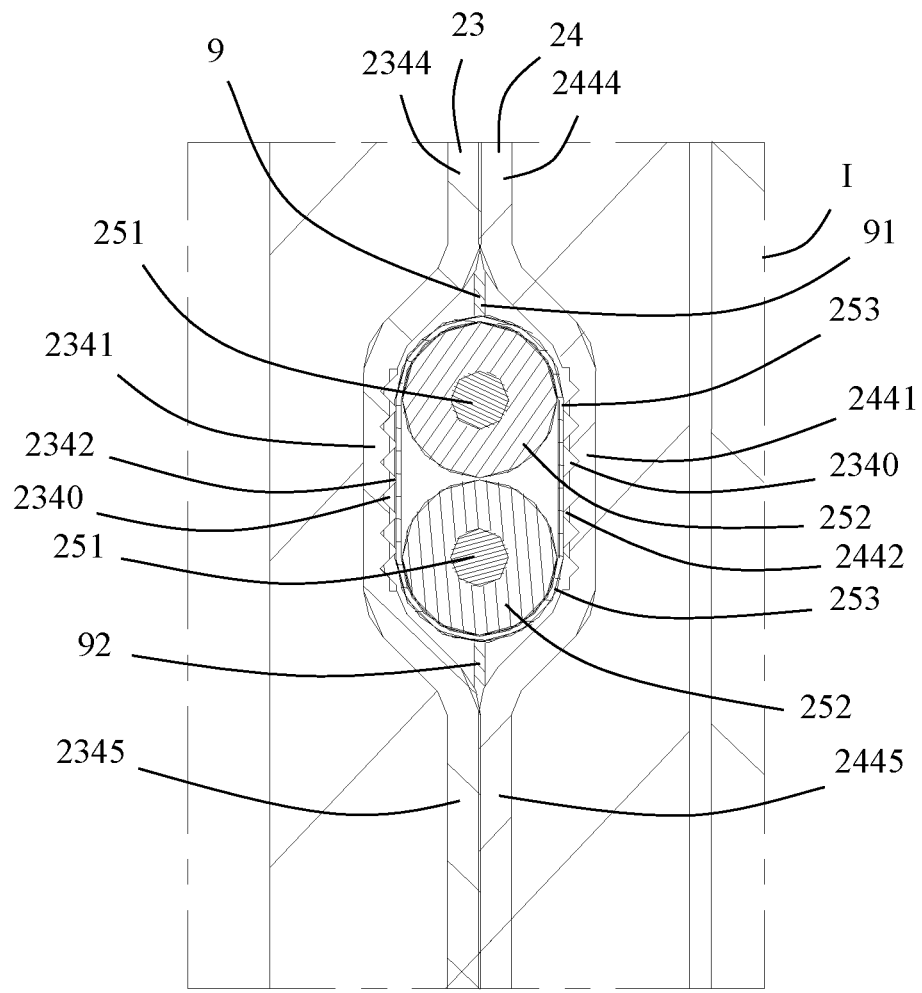
FIG. 18 is a partial enlarged view of a frame portion I in FIG. 17.

Referring to FIGS. 17 and 18, the first abutting portion 2341 of the first metal shield 23 and the second abutting portion 2441 of the second metal shield 24 are in contact with the corresponding first shielding layer 253 of the first cable 25. By such arrangement, it is beneficial to improve the shielding effect and improve the quality of signal transmission.

In the illustrated embodiment of the present disclosure, the first abutting portion 2341 of the first extension tail 234 and the second abutting portion 2441 of the second extension tail 244 jointly clamp the corresponding first shielding layer 253 of the first cable 25. The tip portions 2343 of the first protruding portion 2342 and the tip portions 2443 of the second protruding portion 2442 abut against the first shielding layer 253 of the first cable 25, so as to improve the holding force with the first shielding layer 253. Through this design, on the one hand, it can better improve the contact reliability; on the other hand, it is beneficial to prevent the first cable 25 from loosening. In addition, the tip portions 2343 of the first protruding portion 2342 and the tip portions 2443 of the second protruding portion 2442 pierce the corresponding first shielding layer 253 of the first cable 25, thereby further improving the holding force. In the illustrated embodiment of the present disclosure, by providing the saw teeth, when the tip portions 2343 of the first protruding portion 2342 and the tip portions 2443 of the second protruding portion 2442 abut against or pierce the first shielding layer 253 of the first cable 25, gaps 2340 formed between adjacent saw teeth can facilitate the injection of conductive slurry into the gaps 2340. Therefore, the electrical connection effect of the first extension tail 234, the second extension tail 244 and the first shielding layer 253 is further improved, and the contact reliability and holding force are further improved.

Referring to FIGS. 4 and 8, the first outer covering portion 260 is partially wrapped around the first tail portions 222 of the first conductive terminals 22, the first extension tail 234 of the first metal shield 23, the second extension tail 244 of the second metal shield 24 and the first cables 25. Therefore, the integrity of the first mating module 2 is improved, which is beneficial to improve the assembly efficiency.

In the illustrated embodiment of the present disclosure, multiple first mating modules 2 of the first electrical connector 100 are provided. The terminal arrangement of the two adjacent first mating modules 2 is staggered. Correspondingly, the shielding cavities 26 at the same position of the two adjacent first mating modules 2 are staggered (referring to FIG. 14). The shielding spaces 27 at the same position of the two adjacent first mating modules 2 are staggered (referring to FIG. 16).

Figure 19:
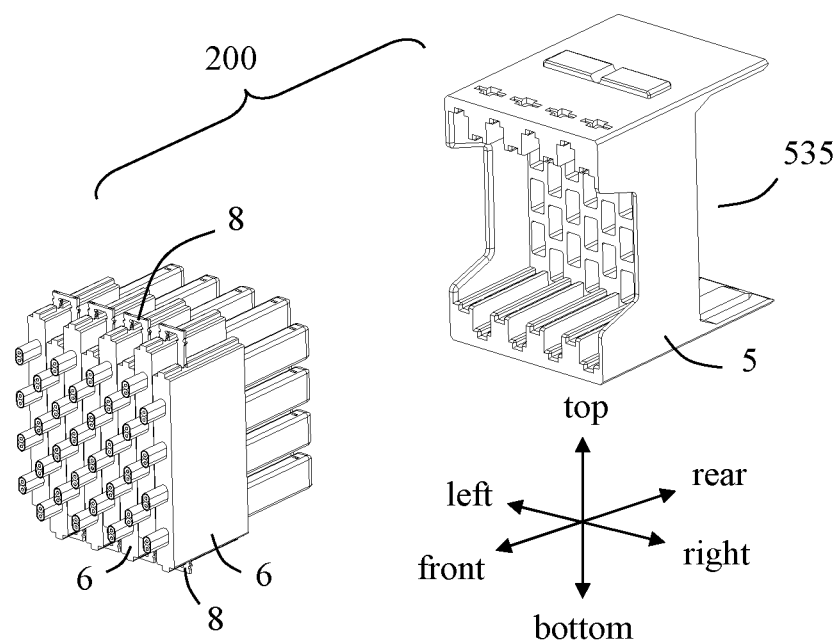
FIG. 19 is a partial perspective exploded view of the second electrical connector in FIG. 2, in which a second housing is separated.

Referring to FIG. 19, the second electrical connector 200 includes a second housing 5, a plurality of second mating modules 6 mounted to the second housing 5, and a plurality of second positioning pieces 8 for positioning the second mating modules 6 in the second housing 5. The second housing 5 includes a receiving space 535 for at least partially receiving the first electrical connector 100.

Referring to FIGS. 20 to 25, each second mating module 6 includes a plurality of insulating blocks 65, a plurality of second terminal modules 60 mounted to the insulating blocks 65, a plurality of metal shield surrounding members 66 sleeved on the insulating blocks 65 and the second terminal modules 60, a metal shielding plate 67 for mating with the metal shield surrounding members 66, a plurality of second cables 68 electrically connected to the second terminal modules 60, and a second outer covering portion 69 partially covering the second terminal modules 60, the metal shield surrounding members 66, the metal shielding plate 67 and the second cables 68.

Figure 25:
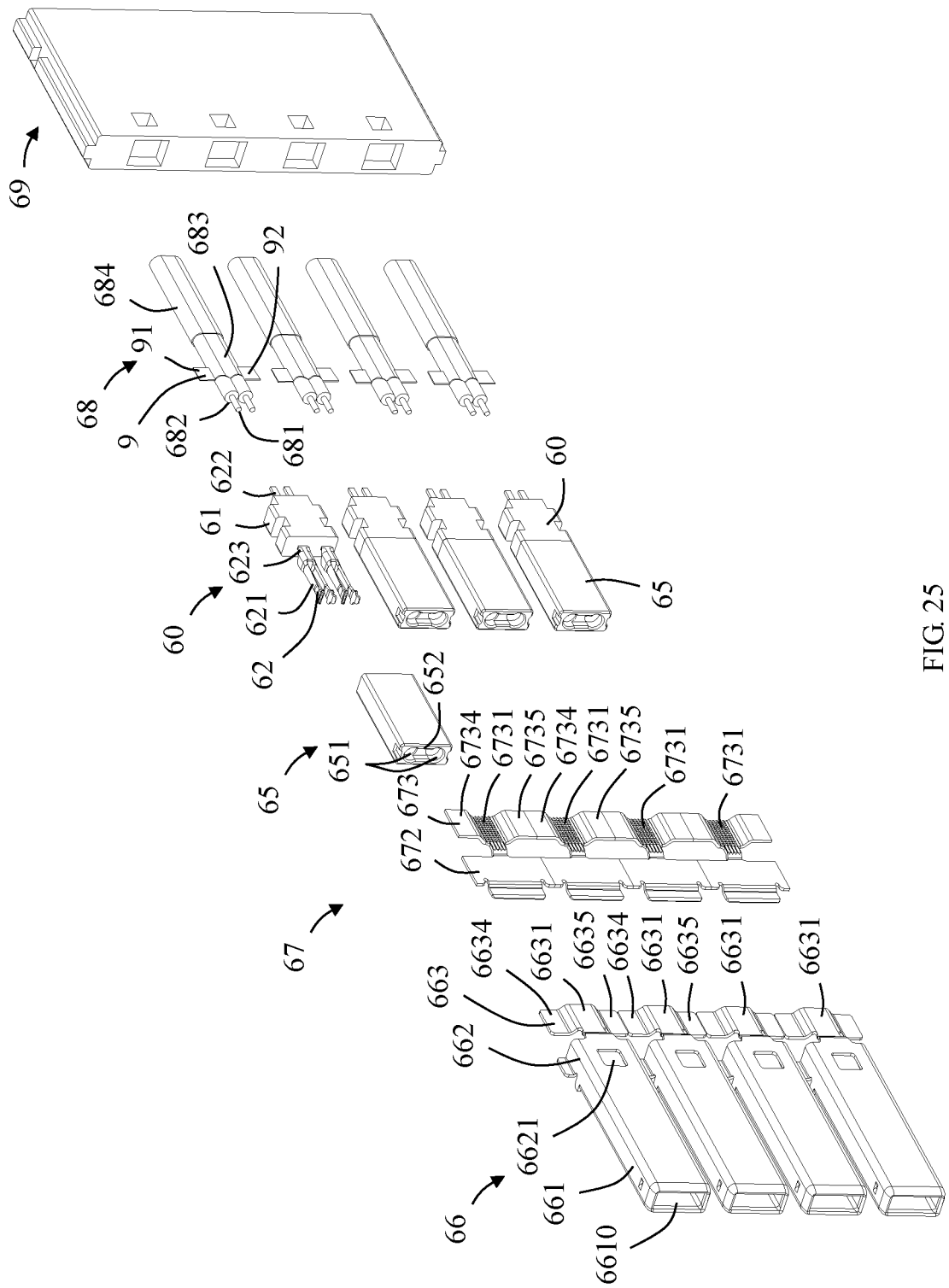
FIG. 25 is a further perspective exploded view of FIG. 23.

Referring to FIG. 25, each second terminal module 60 includes an insulating member 61 and a plurality of second conductive terminals 62 fixed to the insulating member 61. In an embodiment of the present disclosure, the second conductive terminals 62 are insert-molded with the insulating member 61. Of course, in other embodiments, the second conductive terminals 62 may also be fixed to the insulating member 61 by assembling or the like.

Each group of second conductive terminals 62 include a second contact arm 621, a second tail portion 622, and a second connection portion 623 connecting the second contact arm 621 and the second tail portion 622. The second connection portions 623 of the second conductive terminals 62 are fixed to the insulating member 61. The second contact arm 621 extends forwardly and protrudes beyond the insulating member 61 for being electrically connected with the first electrical connector 100. The second tail portion 622 extends backwardly and protrudes beyond the insulating member 61 for being electrically connected to the second cable 68. In the illustrated embodiment of the present disclosure, the second conductive terminal 62 is substantially straight and extends in the front-rear direction.

In an embodiment of the present disclosure, the second conductive terminals 62 of each second terminal module 60 form a pair of second differential signal terminals in order to increase the signal transmission rate.

Each of the insulating blocks 65 includes a mating surface 652 at an end and two through holes 651 into which the second contact arms 621 of the second conductive terminals 62 are inserted. The through holes 651 extend through the mating surface 652.

Referring to FIG. 25, the metal shield surrounding member 66 includes a hollow portion 661, a first extended portion 662 connected to the hollow portion 661, and a third extension tail 663 connected to the first extended portion 662. In an embodiment of the present disclosure, the third extension tail 663 is made of copper material electroplated with nickel. The hollow portion 661 includes a shielding chamber 6610 for accommodating the insulating block 65 and the second terminal module 60 so as to improve the shielding effect. A cross-section of the first extended portion 662 is approximately U-shaped. The first extended portion 662 includes an opening 6621 corresponding to the second tail portion 622.

The third extension tail 663 includes a plurality of third abutting portions 6631 facing a direction toward the metal shielding plate 67. Each third abutting portion 6631 further includes a plurality of third protrusions. In the illustrated embodiment of the present disclosure, the third protrusions are saw teeth each of which includes a substantially pyramid-shaped tip portion (referring to the saw teeth as shown in FIGS. 11 and 12).

In an embodiment of the present disclosure, the third extension tail 663 further includes a plurality of fifth bridge portions 6634 and a plurality of sixth bridge portions 6335 extending from upper and lower sides of the third abutting portions 6631, respectively. The adjacent fifth bridge portion 6634 and sixth bridge portion 6335 are connected together. By providing the fifth bridge portions 6634 and the sixth bridge portions 6335, on the one hand, the grounding area of the third extension tail 663 is increased, thus the shielding effect is improved; on the other hand, the third extension tail 663 can be connected as a whole along the vertical direction, thereby improving the structural strength.

The metal shielding plate 67 includes a second extended portion 672 and a fourth extension tail 673 connected to the second extended portion 672. In an embodiment of the present disclosure, the fourth extension tail 673 is made of copper material electroplated with nickel. The second extended portion 672 is disposed opposite to the first extended portion 662. The fourth extension tail 673 and the third extension tail 663 are disposed opposite to each other.

In other words, at a location where the second tail portion 622 of the second conductive terminal 62 is connected to the second cable 68, the metal shielding plate 67, and the first extended portion 662 and the third extension tail 663 of the metal shield surrounding member 66 are located on two sides, respectively, and are used to clamp the second cable 68.

Figure 22:
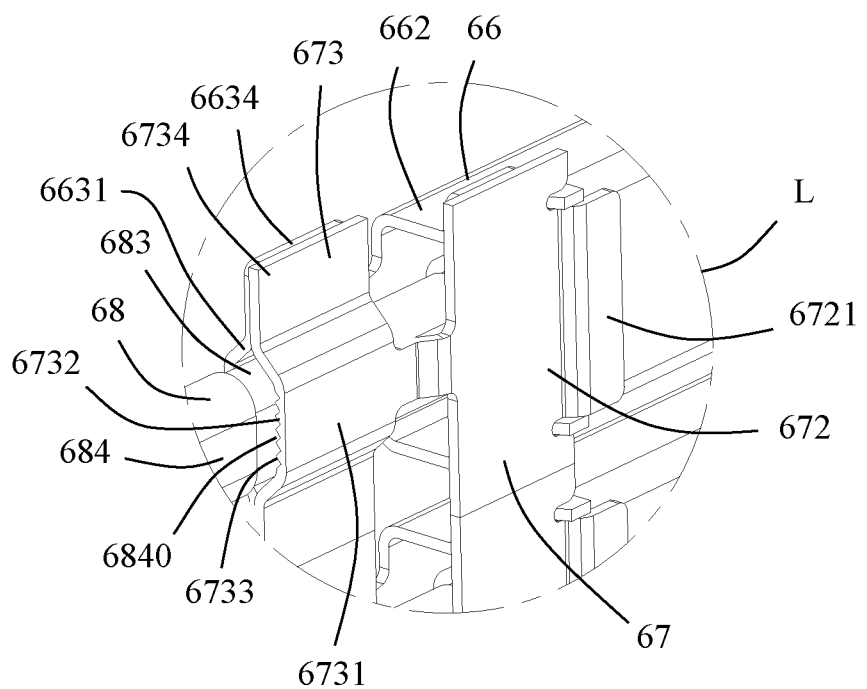
FIG. 22 is a partial enlarged view of a circled portion L in FIG. 21.
Figure 23:
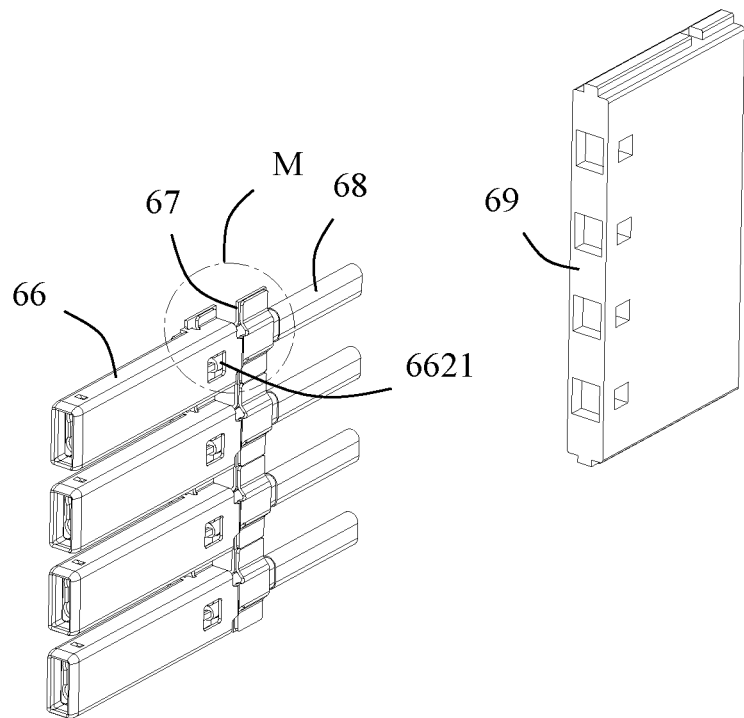
FIG. 23 is a partially exploded perspective view of FIG. 21 from another angle.

Referring to FIG. 22, the fourth extension tail 673 includes a plurality of fourth abutting portions 6731 facing a direction toward the third abutting portion 6631. Each fourth abutting portion 6731 further includes a plurality of fourth protrusions 6732. In the illustrated embodiment of the present disclosure, the fourth protrusions 6732 are saw teeth each of which includes a substantially pyramid-shaped tip portion 6733.

In an embodiment of the present disclosure, the fourth extension tail 673 further includes a plurality of seventh bridge portions 6734 and a plurality of eighth bridge portions 6735 extending from upper and lower sides of the fourth abutting portions 6731, respectively. The adjacent seventh bridge portion 6734 and the eighth bridge portion 6735 are connected together. By providing the seventh bridge portions 6734 and the eighth bridge portions 6735, on the one hand, the grounding area of the fourth extension tail 673 is increased, thus the shielding effect is improved; on the other hand, the fourth extension tail 673 can be connected as a whole along the vertical direction, thereby improving the structural strength. In the illustrated embodiment of the present disclosure, the seventh bridge portions 6734 are in contact with the fifth bridge portions 6634, and the eighth bridge portions 6735 are in contact with the sixth bridge portions 6335 so as to improve the shielding effect.

Figure 20:
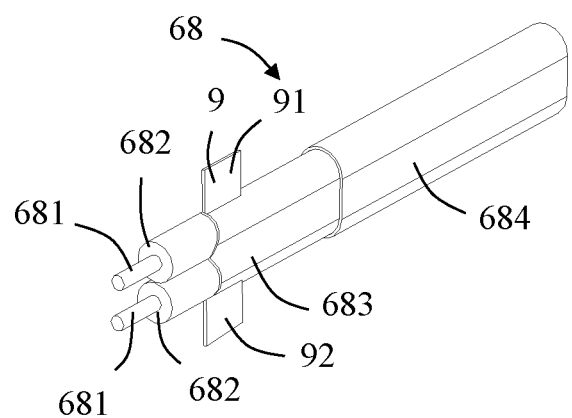
FIG. 20 is a perspective schematic view of a second cable of the second electrical connector.
Figure 21:
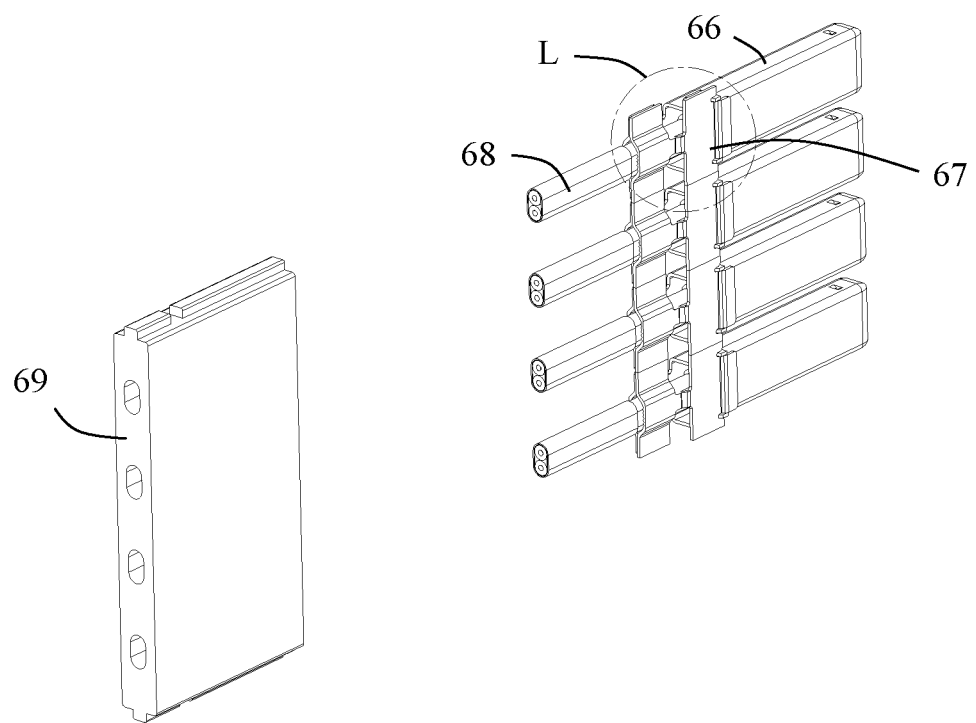
FIG. 21 is a partially exploded perspective view of a second mating module of the second electrical connector.

Referring to FIGS. 20 and 25, each second cable 68 includes second cores 681 for electrically connecting with the second tail portions 622 of the second differential signal terminals, second insulating layers 682 wrapped on the second cores 681, a second shielding layer 683 wrapped on the second insulating layers 682, and a second insulating outer layer 684 wrapped on a part of the second shielding layer 683. In an embodiment of the present disclosure, the second cores 681 are fixed to the second tail portions 622 of the second differential signal terminals by soldering. In the illustrated embodiment of the present disclosure, for each second cable 68 per se, the second shielding layer 683 is partially exposed to the second insulating outer layer 684 in order to be in contact with the third extension tail 663 and the fourth extension tail 673.

Figure 24:
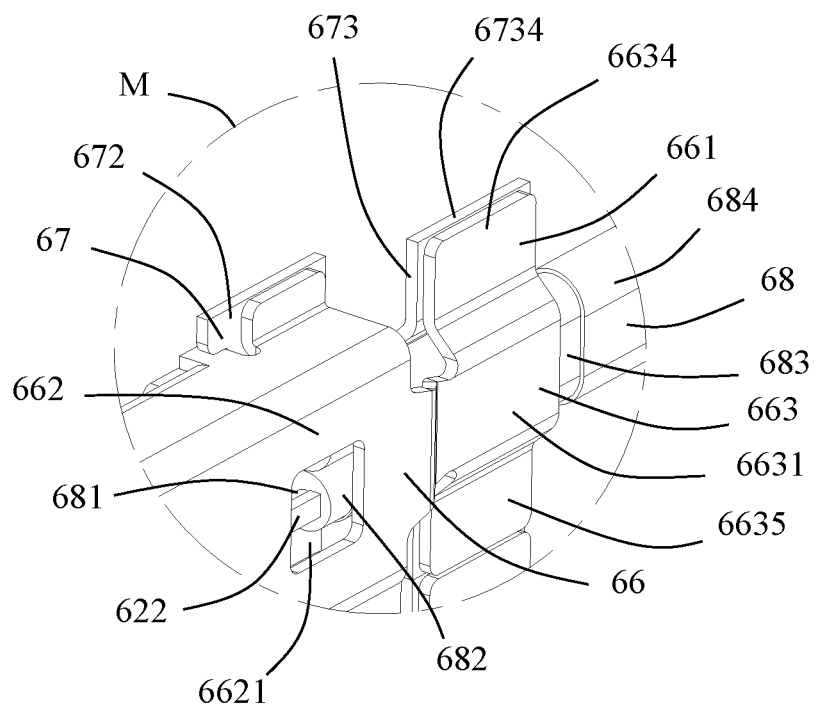
FIG. 24 is a partial enlarged view of a circled portion M in FIG. 23.

Referring to FIGS. 22 and 24, in the illustrated embodiment of the present disclosure, the third abutting portion 6631 of the third extension tail 663 and the fourth abutting portion 6731 of the fourth extension tail 673 jointly clamp the corresponding the second shielding layer 683 of the second cable 68. The saw teeth of the third abutting portions 6631 and the saw teeth of the fourth abutting portions 6731 abut against the second shielding layer 683 of the second cable 68, so as to improve the holding force with the second shielding layer 683. Through such design, on the one hand, it can better improve the contact reliability, and on the other hand, it is beneficial to prevent the second cable 68 from loosening. Further, the saw teeth of the third abutting portions 6631 and the saw teeth of the fourth abutting portions 6731 pierce the corresponding second shielding layer 683 of the second cable 68, thereby further improving the holding force. In the illustrated embodiment of the present disclosure, when the saw teeth of the third abutting portions 6631 and the saw teeth of the fourth abutting portions 6731 abut against or pierce the corresponding second shielding layer 683 of the second cable 68, gaps 6840 between adjacent saw teeth (referring to FIG. 22) can facilitate the injection of conductive slurry into the gaps 6840, thereby further improving the electrical connection effect of the third extension tail 663, the fourth extension tail 673 and the second shielding layer 683, and further improving contact reliability and holding force.

Before forming the second outer covering portion 69, soldering portions of the second cores 681 and the second tail portions 622 of the second differential signal terminals are exposed in the corresponding openings 6621, so that the soldering portions and/or components surrounding the soldering portions can be protected by using a fixture. Then, the second outer covering portion 69 is fixed to the second terminal modules 60, the metal shield surrounding members 66, the metal shielding plate 67 and the second cables 68 by over-molding, thereby improving the integrity of the second mating module 6 and improving the assembly efficiency.

In the illustrated embodiment of the present disclosure, multiple second mating modules 6 of the electrical connector 200 are provided, in which the arrangement of two adjacent second mating modules 6 is staggered. When the second mating modules 6 are mounted to the second housing 5, the metal shield surrounding members 66 of the second mating modules 6 pass through corresponding terminal receiving grooves so as to extend into the receiving space 535.

In order to help in understanding of the technical solutions of the present disclosure, a general concept of the first electrical connector 100 and the second electrical connector 200 is a cable connector. A general concept of the first housing 1 and the second housing 5 is a housing. A general concept of the first mating module 2 and the second mating module 6 is a mating module. A general concept of the first conductive terminal 22 and the second conductive terminal 62 is a conductive terminal. A general concept of the first cable 25 and the second cable 68 is a cable. A general concept of the first core 251 and the second core 681 is a core. A general concept of the first insulating layer 252 and the second insulating layer 682 is an insulating layer. A general concept of the first shielding layer 253 and the second shielding layer 683 is a shielding layer. A general concept of the first metal shield 23 and the metal shield surrounding member 66 is a first metal shield member. A general concept of the second metal shield 24 and the metal shielding plate 67 is a second metal shield member. A general concept of the first bridge portion 2344, the second bridge portion 2345, the fifth bridge portion 6634 and the sixth bridge portion 6335 is a first mounting piece 95. A general concept of the third bridge portion 2444, the fourth bridge portion 2445, the seventh bridge portion 6734 and the eighth bridge portion 6735 is a second mounting piece 96.

Figure 27:
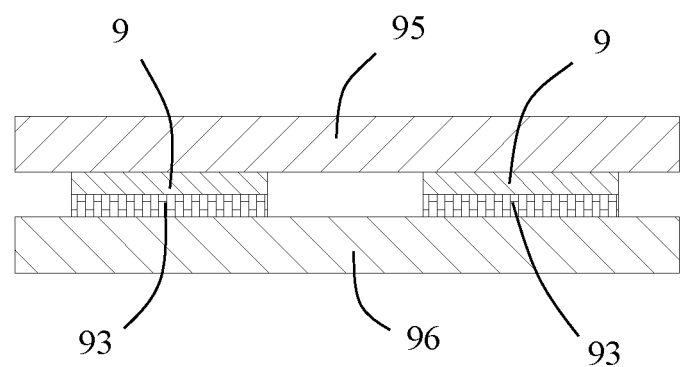
FIG. 27 is a schematic cross-sectional view of mutual positional relationships between the first mounting piece, the protruding piece, a polyester film and the second mounting piece in accordance with a first embodiment of the present disclosure.
Figure 28:
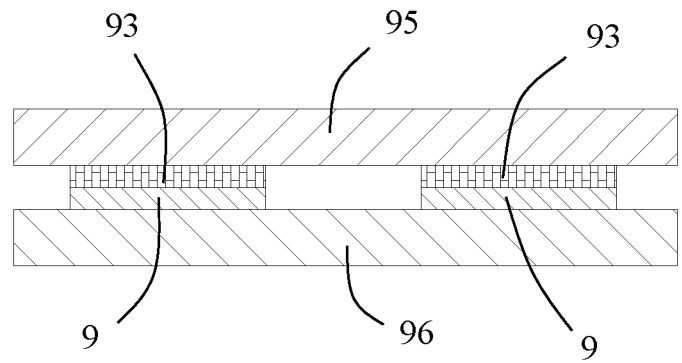
FIG. 28 is a schematic cross-sectional view of mutual positional relationships between the first mounting piece, the protruding piece, the polyester film and the second mounting piece in accordance with a second embodiment of the present disclosure.
Figure 29:
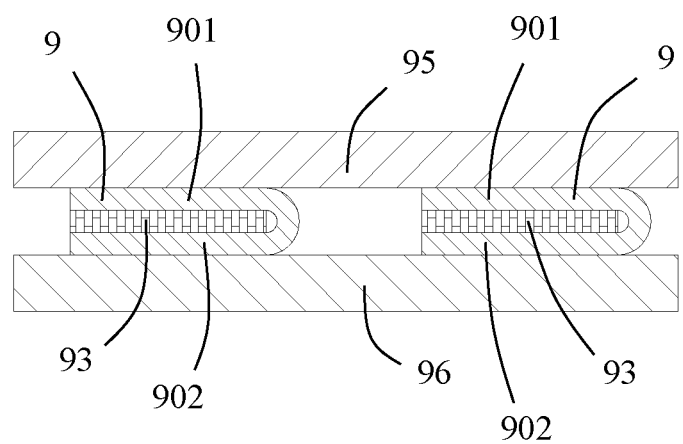
FIG. 29 is a schematic cross-sectional view of mutual positional relationships between the first mounting piece, the protruding piece, the polyester film and the second mounting piece in accordance with a third embodiment of the present disclosure.

The cable also includes a protruding piece 9 connected to the shielding layer. The protruding piece 9 extends integrally with the shielding layer; or the protruding piece 9 and the shielding layer are arranged separately, but connected together. In an embodiment of the present disclosure, the shielding layer and the protruding piece 9 are made of aluminum foil. Referring to FIG. 27, the mating module includes a polyester film 93 (for example, a Mylar, the same below) sandwiched by the protruding piece 9 and the second mounting piece 96. And/or, as shown in FIG. 28, the mating module includes a polyester film 93 sandwiched by the protruding piece 9 and the first mounting piece 95. Referring to FIG. 29, in an embodiment of the present disclosure, the protruding piece 9 has a double-layer structure, and includes a first layer of protruding piece 901 and a second layer of protruding piece 902. The mating module also includes a polyester film 93 sandwiched by the first layer of protruding piece 901 and the second layer of protruding piece 902. Referring to FIGS. 7 and 20, in the illustrated embodiment of the present disclosure, the protruding piece 9 includes a first protruding piece 91 located on one side (for example, an upper side) of the insulating layer and a second protruding piece 92 on the other side (for example, a lower side) of the insulating layer. The first protruding piece 91 and/or the second protruding piece 92 may have the aforementioned double-layer structure. The protruding piece 9 is directly or indirectly clamped by the first mounting piece 95 and the second mounting piece 96. The protruding piece 9 is fixed to the first mounting piece 95 and/or the second mounting piece 96 by soldering. Specifically, referring to FIG. 18, in the first mating module 2, the first bridge portion 2344 and the third bridge portion 2444 clamp the first protruding piece 91, and the second bridge portion 2345 and the fourth bridge portion 2445 clamp the second protruding piece 92. In the second mating module 6, as shown in FIG. 25, the fifth bridge portion 6634 and the seventh bridge portion 6734 clamp the first protruding piece 91, and the sixth bridge portion 6335 and the eighth bridge portion 6735 clamp the second protruding piece 92. It is understandable to those skilled in the art that the polyester film 93 can be arranged in various ways or even without the polyester film 93, which will not be repeated here in the present disclosure.

Figure 26:
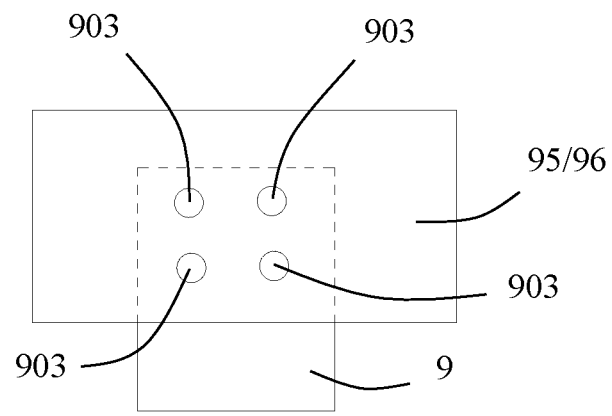
FIG. 26 is a schematic view of a protruding piece and a first mounting piece and/or a second mounting piece when they are spot-soldered.

Referring to FIG. 26, the protruding piece 9 and the first mounting piece 95 and/or the second mounting piece 96 include at least one copper-nickel-aluminum alloy soldering joint 903 formed by laser soldering. The copper-nickel-aluminum alloy soldering joint 903 is formed by, for example, laser soldering on one side. Referring to FIG. 29, when the first protruding piece 91 and the second protruding piece 92 have double-layer structure, the first layer of protruding piece 901 and the first mounting piece 95 are fixed by soldering, and the second-layer protruding piece 902 and the second mounting piece 96 are fixed by soldering.

In an embodiment of the present disclosure, the cable does not include a ground wire, thereby making the cable more flexible. Compared with the prior art, the present disclosure increases the shielding area and improves the shielding effect by soldering and fixing the protruding piece 9 to the first mounting piece 95 and/or the second mounting piece 96.

The above embodiments are only used to illustrate the present disclosure and not to limit the technical solutions described in the present disclosure. The understanding of this specification should be based on those skilled in the art. Descriptions of directions, such as "front", "back", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:
1. A mating module, comprising:
a conductive terminal;
a cable comprising a core electrically connected to the conductive terminal, an insulating layer wrapped on the core and a shielding layer wrapped on the insulating layer;

a first metal shield member comprising a first mounting piece; and a second metal shield member comprising a second mounting piece;

wherein the cable further comprises a protruding piece connected with the shielding layer, the protruding piece is directly or indirectly clamped by the first mounting piece and the second mounting piece, and the protruding piece is fixed to the first mounting piece and/or the second mounting piece by soldering; and wherein the first metal shield member comprises a first abutting portion connected to the first mounting piece, the second metal shield member comprises a second abutting portion connected to the second mounting piece, and the shielding layer is sandwiched by the first abutting portion and the second abutting portion.

2. The mating module according to claim 1, wherein the protruding piece extends integrally from the shielding layer; or the protruding piece and the shielding layer are arranged separately, but connected together.

3. The mating module according to claim 1, wherein the protruding piece is made of aluminum foil; wherein the first mounting piece and the second mounting piece are made of copper material plated with nickel; and wherein the protruding piece and the first mounting piece and/or the second mounting piece comprise at least one copper-nickel-aluminum alloy soldering joint formed by laser soldering.

4. The mating module according to claim 1, further comprising a polyester film clamped between the protruding piece and the first mounting piece; and/or further comprising a polyester film clamped between the protruding piece and the second mounting piece.

5. The mating module according to claim 1, wherein the protruding piece comprises a first layer of protruding piece and a second layer of protruding piece; wherein the mating module comprises a polyester film sandwiched by the first layer of protruding piece and the second layer of protruding piece; and wherein the first layer of protruding piece is fixed to the first mounting piece by soldering, and the second layer of protruding piece is fixed to the second mounting piece by soldering.

6. The mating module according to claim 1, wherein the cable does not have any ground wire.

7. The mating module according to claim 1, wherein the first abutting portion and/or the second abutting portion comprises a plurality of saw teeth which pierce the shielding layer.

8. The mating module according to claim 1, wherein the protruding piece comprises a first protruding piece located on one side of the insulating layer and a second protruding piece located on the other side of the insulating layer;

wherein the conductive terminal comprises a plurality of first conductive terminals, and the mating module comprises an insulating bracket to fix the first conductive terminals;

wherein the cable comprises a first cable, the core comprises first cores electrically connected to the first conductive terminals, the insulating layer comprises first insulating layers wrapped on the first cores, the shielding layer comprises a first shielding layer wrapped on the first insulating layers, and the protruding piece is connected to the first shielding layer;

wherein the first metal shield member comprises a first metal shield, and the first mounting piece comprises a first bridge portion and a second bridge portion;

wherein the second metal shield member comprises a second metal shield, the second mounting piece comprises a third bridge portion and a fourth bridge portion, the first metal shield and the second metal shield are located on opposite sides of the insulating bracket; and wherein the first protruding piece is sandwiched by the first bridge portion and the third bridge portion, and the second protruding piece is sandwiched by the second bridge portion and the fourth bridge portion.

9. The mating module according to claim 1, wherein the protruding piece comprises a first protruding piece located on one side of the insulating layer, and a second protruding piece located on the other side of the insulating layer;

wherein the conductive terminal comprises a plurality of second conductive terminals, and the mating module comprises an insulating block to fix the second conductive terminals;

wherein the cable comprises a second cable, the core comprises second cores electrically connected to the second conductive terminals, the insulating layer comprises second insulating layers wrapped on the second cores, the shielding layer comprises a second shielding layer wrapped on the second insulating layers, and the protruding piece is connected to the second shielding layer;

wherein the first metal shield member comprises a metal shield surrounding member, the metal shield surrounding member comprises a hollow portion surrounding the second conductive terminals, and the first mounting piece comprises a fifth bridge portion and a sixth bridge portion;

wherein the second metal shield member comprises a metal shielding plate mating with the metal shield surrounding member, and the second mounting piece comprises a seventh bridge portion and an eighth bridge portion; and wherein the first protruding piece is sandwiched by the fifth bridge portion and the seventh bridge portion, and the second protruding piece is sandwiched by the sixth bridge portion and the eighth bridge portion.

10. A cable connector, comprising:

a housing; and a plurality of mating modules mounted to the housing;

each mating module comprising:

a conductive terminal;

a cable comprising a core electrically connected to the conductive terminal, an insulating layer wrapped on the core and a shielding layer wrapped on the insulating layer;

a first metal shield member comprising a first mounting piece; and a second metal shield member comprising a second mounting piece;

wherein the cable further comprises a protruding piece connected with the shielding layer, the protruding piece is directly or indirectly clamped by the first mounting piece and the second mounting piece, and the protruding piece is fixed to the first mounting piece and/or the second mounting piece by soldering; and wherein the first metal shield member comprises a first abutting portion connected to the first mounting piece, the second metal shield member comprises a second abutting portion connected to the second mounting piece, the shielding layer is sandwiched by the first abutting portion and the second abutting portion.

11. The cable connector according to claim 10, wherein the protruding piece extends integrally from the shielding layer; or
  the protruding piece and the shielding layer are arranged separately, but connected together.

12. The cable connector according to claim 10, wherein the protruding piece is made of aluminum foil; wherein the first mounting piece and the second mounting piece are made of copper material plated with nickel; and wherein the protruding piece and the first mounting piece and/or the second mounting piece comprise at least one copper-nickel-aluminum alloy soldering joint formed by laser soldering.

13. The cable connector according to claim 10, the mating module further comprises a polyester film clamped between the protruding piece and the first mounting piece; and/or
  the mating module further comprises a polyester film clamped between the protruding piece and the second mounting piece.

14. The cable connector according to claim 10, wherein the protruding piece comprises a first layer of protruding piece and a second layer of protruding piece; wherein the mating module comprises a polyester film sandwiched by the first layer of protruding piece and the second layer of protruding piece; and wherein the first layer of protruding piece is fixed to the first mounting piece by soldering, and the second layer of protruding piece is fixed to the second mounting piece by soldering.

15. The cable connector according to claim 10, wherein the cable does not have any ground wire.

16. The cable connector according to claim 10, wherein the first abutting portion and/or the second abutting portion comprises a plurality of saw teeth which pierce the shielding layer.

17. The cable connector according to claim 10, wherein the protruding piece comprises a first protruding piece located on one side of the insulating layer and a second protruding piece located on the other side of the insulating layer;
  wherein the conductive terminal comprises a plurality of first conductive terminals, and the mating module comprises an insulating bracket to fix the first conductive terminals;
  wherein the cable comprises a first cable, the core comprises first cores electrically connected to the first conductive terminals, the insulating layer comprises first insulating layers wrapped on the first cores, the shielding layer comprises a first shielding layer wrapped on the first insulating layers, and the protruding piece is connected to the first shielding layer;
  wherein the first metal shield member comprises a first metal shield, and the first mounting piece comprises a first bridge portion and a second bridge portion;
  wherein the second metal shield member comprises a second metal shield, the second mounting piece comprises a third bridge portion and a fourth bridge portion, the first metal shield and the second metal shield are located on opposite sides of the insulating bracket; and
  wherein the first protruding piece is sandwiched by the first bridge portion and the third bridge portion, and the second protruding piece is sandwiched by the second bridge portion and the fourth bridge portion.

18. The cable connector according to claim 10, wherein the protruding piece comprises a first protruding piece located on one side of the insulating layer, and a second protruding piece located on the other side of the insulating layer;
  wherein the conductive terminal comprises a plurality of second conductive terminals, and the mating module comprises an insulating block to fix the second conductive terminals;
  wherein the cable comprises a second cable, the core comprises second cores electrically connected to the second conductive terminals, the insulating layer comprises second insulating layers wrapped on the second cores, the shielding layer comprises a second shielding layer wrapped on the second insulating layers, and the protruding piece is connected to the second shielding layer;
  wherein the first metal shield member comprises a metal shield surrounding member, the metal shield surrounding member comprises a hollow portion surrounding the second conductive terminals, and the first mounting piece comprises a fifth bridge portion and a sixth bridge portion;
  wherein the second metal shield member comprises a metal shielding plate mating with the metal shield surrounding member, and the second mounting piece comprises a seventh bridge portion and an eighth bridge portion; and
  wherein the first protruding piece is sandwiched by the fifth bridge portion and the seventh bridge portion, and the second protruding piece is sandwiched by the sixth bridge portion and the eighth bridge portion.

19. A mating module, comprising:
  a conductive terminal;
  a cable comprising a core electrically connected to the conductive terminal, an insulating layer wrapped on the core and a shielding layer wrapped on the insulating layer;
  a first metal shield member comprising a first mounting piece; and
  a second metal shield member comprising a second mounting piece;
  wherein the cable further comprises a protruding piece connected with the shielding layer, the protruding piece is directly or indirectly clamped by the first mounting piece and the second mounting piece, and the protruding piece is fixed to the first mounting piece and/or the second mounting piece by soldering;
  wherein the protruding piece comprises a first protruding piece located on one side of the insulating layer and a second protruding piece located on the other side of the insulating layer;
  wherein the conductive terminal comprises a plurality of first conductive terminals, and the mating module comprises an insulating bracket to fix the first conductive terminals;
  wherein the cable comprises a first cable, the core comprises first cores electrically connected to the first conductive terminals, the insulating layer comprises first insulating layers wrapped on the first cores, the shielding layer comprises a first shielding layer wrapped on the first insulating layers, and the protruding piece is connected to the first shielding layer;
  wherein the first metal shield member comprises a first metal shield, and the first mounting piece comprises a first bridge portion and a second bridge portion;
  wherein the second metal shield member comprises a second metal shield, the second mounting piece comprises a third bridge portion and a fourth bridge portion, the first metal shield and the second metal shield are located on opposite sides of the insulating bracket; and wherein the first protruding piece is sandwiched by the first bridge portion and the third bridge portion, and the second protruding piece is sandwiched by the second bridge portion and the fourth bridge portion.

20. The mating module according to claim 19, wherein the protruding piece extends integrally from the shielding layer; or the protruding piece and the shielding layer are arranged separately, but connected together.

\* \* \* \* \*